US009747390B2

(12) United States Patent
Cooper et al.

(10) Patent No.: US 9,747,390 B2
(45) Date of Patent: Aug. 29, 2017

(54) ONTOLOGY FOR USE WITH A SYSTEM, METHOD, AND COMPUTER READABLE MEDIUM FOR RETRIEVING INFORMATION AND RESPONSE TO A QUERY

(71) Applicant: Oracle OTC Subsidiary LLC, Redwood Shores, CA (US)

(72) Inventors: Edwin Riley Cooper, Oakland, CA (US); Gann Bierner, Oakland, CA (US); Deniz Yuret, Istanbul (TR); James Charles Williams, San Rafael, CA (US); Filippo Beghelli, Glendale, CA (US); Laurel Kathleen Graham, Los Angeles, CA (US)

(73) Assignee: ORACLE OTC SUBSIDIARY LLC, Redwood Shores, CA (US)

( * ) Notice: Subject to any disclaimer, the term of this patent is extended or adjusted under 35 U.S.C. 154(b) by 309 days.

(21) Appl. No.: 14/081,746

(22) Filed: Nov. 15, 2013

(65) Prior Publication Data
US 2014/0074826 A1 Mar. 13, 2014

Related U.S. Application Data

(63) Continuation of application No. 10/820,341, filed on Apr. 7, 2004, now Pat. No. 8,612,208.

(51) Int. Cl.
*G06F 17/27* (2006.01)
*G06F 7/00* (2006.01)
*G06F 17/30* (2006.01)

(52) U.S. Cl.
CPC .... *G06F 17/30979* (2013.01); *G06F 17/2735* (2013.01); *G06F 17/2785* (2013.01); *G06F 17/30672* (2013.01); *G06F 17/30734* (2013.01)

(58) Field of Classification Search
USPC .............................................. 704/9, 10, 257
See application file for complete search history.

(56) References Cited

U.S. PATENT DOCUMENTS

| 4,956,774 A | 9/1990 | Shibamiya et al. |
| 5,321,833 A | 6/1994 | Chang et al. |

(Continued)

FOREIGN PATENT DOCUMENTS

| EP | 1104568 | 6/2001 |
| EP | 2021989 | 2/2009 |

(Continued)

OTHER PUBLICATIONS

Stolowitz Ford Cowger LLP, Listing of Related Cases, Aug. 19, 2009.

(Continued)

*Primary Examiner* — Olujimi Adesanya
(74) *Attorney, Agent, or Firm* — Kilpatrick Townsend & Stockton LLP

(57) ABSTRACT

A system, method, and computer readable medium for applying one or more information retrieval technologies is disclosed for resolving a query. In one embodiment, an exemplary system generates a response using a language analysis module configured to parse a query into elements. This system can also include a rules engine configured to compare a condition of a rule against the elements, where the rule is configured to perform an action to retrieve information. Further, a response generator coupled to said rules engine receives the rule and retrieves the information for presentation to a querier in a portion of a display that adjusts proportionately to the degree of importance of said information.

20 Claims, 11 Drawing Sheets

(56) References Cited

U.S. PATENT DOCUMENTS

| | | |
|---|---|---|
| 5,357,436 A | 10/1994 | Chiu |
| 5,386,556 A | 1/1995 | Hedin et al. |
| 5,442,782 A | 8/1995 | Malatesta et al. |
| 5,535,382 A | 7/1996 | Ogawa |
| 5,608,624 A | 3/1997 | Luciw |
| 5,625,814 A | 4/1997 | Luciw |
| 5,694,523 A | 12/1997 | Wical |
| 5,694,546 A | 12/1997 | Reisman |
| 5,742,816 A | 4/1998 | Barr et al. |
| 5,794,050 A | 8/1998 | Dahlgren et al. |
| 5,812,865 A | 9/1998 | Theimer et al. |
| 5,826,269 A | 10/1998 | Hussey |
| 5,848,399 A | 12/1998 | Burke |
| 5,873,056 A | 2/1999 | Liddy et al. |
| 5,873,076 A | 2/1999 | Barr et al. |
| 5,873,080 A | 2/1999 | Coden et al. |
| 5,878,423 A | 3/1999 | Anderson et al. |
| 5,884,302 A | 3/1999 | Ho |
| 5,890,152 A | 3/1999 | Rapaport et al. |
| 5,893,091 A | 4/1999 | Hunt et al. |
| 5,897,622 A | 4/1999 | Blinn et al. |
| 5,901,287 A | 5/1999 | Bull et al. |
| 5,913,215 A | 6/1999 | Rubinstein et al. |
| 5,933,822 A | 8/1999 | Braden-Harder et al. |
| 5,948,054 A | 9/1999 | Nielsen |
| 5,963,940 A | 10/1999 | Liddy et al. |
| 5,966,695 A | 10/1999 | Melchione et al. |
| 5,974,392 A | 10/1999 | Endo |
| 5,974,412 A | 10/1999 | Hazlehurst et al. |
| 5,987,454 A | 11/1999 | Hobbs |
| 5,995,921 A | 11/1999 | Richards et al. |
| 6,006,225 A | 12/1999 | Bowman et al. |
| 6,016,476 A | 1/2000 | Maes et al. |
| 6,021,403 A | 2/2000 | Horvitz et al. |
| 6,026,388 A | 2/2000 | Liddy et al. |
| 6,028,601 A | 2/2000 | Machiraju et al. |
| 6,038,560 A | 3/2000 | Wical |
| 6,052,710 A | 4/2000 | Saliba et al. |
| 6,061,057 A | 5/2000 | Knowlton et al. |
| 6,070,149 A | 5/2000 | Tavor et al. |
| 6,076,088 A | 6/2000 | Paik et al. |
| 6,078,914 A | 6/2000 | Redfern |
| 6,094,652 A | 7/2000 | Faisal |
| 6,151,600 A | 11/2000 | Dedrick |
| 6,208,991 B1 | 3/2001 | French et al. |
| 6,233,547 B1 | 5/2001 | Denber |
| 6,260,035 B1 | 7/2001 | Horvitz et al. |
| 6,278,996 B1 | 8/2001 | Richardson et al. |
| 6,282,534 B1 | 8/2001 | Vora |
| 6,285,998 B1 | 9/2001 | Black et al. |
| 6,370,535 B1 | 4/2002 | Shapiro et al. |
| 6,385,592 B1 | 5/2002 | Angles et al. |
| 6,393,479 B1 | 5/2002 | Glommen et al. |
| 6,401,084 B1 | 6/2002 | Ortega et al. |
| 6,401,094 B1 | 6/2002 | Stemp et al. |
| 6,405,190 B1 | 6/2002 | Conklin |
| 6,466,899 B1 | 10/2002 | Yano et al. |
| 6,471,521 B1 | 10/2002 | Dornbush et al. |
| 6,477,551 B1 | 11/2002 | Johnson et al. |
| 6,480,843 B2 | 11/2002 | Li |
| 6,556,988 B2 | 4/2003 | Tsuchida et al. |
| 6,564,213 B1 | 5/2003 | Ortega et al. |
| 6,584,464 B1 | 6/2003 | Warthen |
| 6,675,159 B1 | 1/2004 | Lin et al. |
| 6,678,694 B1 * | 1/2004 | Zimmermann ... G06F 17/30705 707/731 |
| 6,766,320 B1 | 7/2004 | Wang et al. |
| 6,907,414 B1 | 6/2005 | Parnell |
| 6,928,425 B2 | 8/2005 | Grefenstette et al. |
| 6,941,301 B2 | 9/2005 | Ferguson et al. |
| 6,944,711 B2 | 9/2005 | Mogi et al. |
| 6,957,213 B1 | 10/2005 | Yuret |
| 7,024,400 B2 | 4/2006 | Tokuda et al. |
| 7,035,864 B1 | 4/2006 | Ferrari et al. |
| 7,035,910 B1 | 4/2006 | Dutta et al. |
| 7,111,290 B1 | 9/2006 | Yates, Jr. et al. |
| 7,117,207 B1 | 10/2006 | Kerschberg et al. |
| 7,136,845 B2 | 11/2006 | Chandrasekar et al. |
| 7,149,732 B2 | 12/2006 | Wen et al. |
| 7,177,795 B1 | 2/2007 | Chen et al. |
| 7,181,731 B2 | 2/2007 | Pace et al. |
| 7,209,921 B2 | 4/2007 | Pace et al. |
| 7,234,140 B2 | 6/2007 | Dortmans |
| 7,254,806 B1 | 8/2007 | Yates, Jr. et al. |
| 7,325,193 B2 | 1/2008 | Edd et al. |
| 7,428,541 B2 | 9/2008 | Houle |
| 7,617,184 B2 | 11/2009 | Ferrari et al. |
| 7,668,850 B1 | 2/2010 | Bierner |
| 7,672,951 B1 | 3/2010 | Bierner |
| 7,676,517 B2 | 3/2010 | Hurst-Hiller et al. |
| 7,747,601 B2 | 6/2010 | Cooper et al. |
| 7,890,526 B1 | 2/2011 | Brewer et al. |
| 7,921,099 B2 | 4/2011 | Bierner |
| 8,082,264 B2 | 12/2011 | Bierner |
| 8,296,284 B2 | 10/2012 | Bierner |
| 8,478,780 B2 | 7/2013 | Cooper et al. |
| 8,612,208 B2 | 12/2013 | Cooper et al. |
| 8,781,813 B2 | 7/2014 | Cooper et al. |
| 8,898,140 B2 | 11/2014 | Cooper et al. |
| 8,924,410 B2 | 12/2014 | Bierner |
| 9,262,528 B2 | 2/2016 | Cooper et al. |
| 2001/0014888 A1 | 8/2001 | Tsuchida et al. |
| 2001/0047270 A1 | 11/2001 | Gusick et al. |
| 2002/0023144 A1 | 2/2002 | Linyard et al. |
| 2002/0049738 A1 | 4/2002 | Epstein |
| 2002/0051020 A1 | 5/2002 | Ferrari et al. |
| 2002/0078090 A1 | 6/2002 | Hwang et al. |
| 2002/0103809 A1 | 8/2002 | Starzl et al. |
| 2002/0152202 A1 | 10/2002 | Perro et al. |
| 2002/0184255 A1 | 12/2002 | Edd et al. |
| 2003/0014403 A1 | 1/2003 | Chandrasekar et al. |
| 2003/0018512 A1 | 1/2003 | Dortmans |
| 2003/0037073 A1 | 2/2003 | Tokuda et al. |
| 2003/0051236 A1 | 3/2003 | Pace et al. |
| 2003/0078958 A1 | 4/2003 | Pace et al. |
| 2003/0101153 A1 | 5/2003 | Francis et al. |
| 2003/0140316 A1 | 7/2003 | Lakritz |
| 2003/0144994 A1 | 7/2003 | Wen et al. |
| 2003/0204435 A1 | 10/2003 | McQuilkin et al. |
| 2003/0217052 A1 | 11/2003 | Rubenczyk et al. |
| 2003/0220815 A1 | 11/2003 | Chang et al. |
| 2003/0233224 A1 | 12/2003 | Marchisio et al. |
| 2004/0002887 A1 | 1/2004 | Fliess et al. |
| 2004/0024739 A1 | 2/2004 | Copperman et al. |
| 2004/0049499 A1 * | 3/2004 | Nomoto ............ G06F 17/30654 |
| 2004/0139059 A1 | 7/2004 | Conroy et al. |
| 2004/0139067 A1 | 7/2004 | Houle |
| 2004/0167870 A1 | 8/2004 | Wakefield et al. |
| 2004/0254928 A1 | 12/2004 | Vronay et al. |
| 2005/0080775 A1 | 4/2005 | Colledge et al. |
| 2005/0120045 A1 | 6/2005 | Klawon |
| 2005/0149496 A1 | 7/2005 | Mukherjee et al. |
| 2005/0198563 A1 | 9/2005 | Kristjansson |
| 2005/0203878 A1 | 9/2005 | Brill et al. |
| 2005/0234969 A1 | 10/2005 | Mamou et al. |
| 2005/0267871 A1 | 12/2005 | Marchisio et al. |
| 2006/0053172 A1 | 3/2006 | Gardner et al. |
| 2006/0059073 A1 | 3/2006 | Walzak |
| 2006/0074836 A1 | 4/2006 | Gardner et al. |
| 2006/0095326 A1 | 5/2006 | Sandhu et al. |
| 2006/0106769 A1 | 5/2006 | Gibbs |
| 2006/0122979 A1 | 6/2006 | Kapur et al. |
| 2006/0136403 A1 | 6/2006 | Koo |
| 2006/0173724 A1 | 8/2006 | Trefler et al. |
| 2006/0179404 A1 | 8/2006 | Yolleck et al. |
| 2006/0253427 A1 | 11/2006 | Wu et al. |
| 2006/0259483 A1 | 11/2006 | Ozana |
| 2006/0265232 A1 | 11/2006 | Katariya et al. |
| 2007/0033116 A1 | 2/2007 | Murray |
| 2007/0202475 A1 | 8/2007 | Habichler et al. |
| 2007/0208738 A1 | 9/2007 | Morgan |
| 2007/0282769 A1 | 12/2007 | Bierner |
| 2008/0065617 A1 | 3/2008 | Burke et al. |
| 2008/0104037 A1 | 5/2008 | Bierner |

(56) References Cited

U.S. PATENT DOCUMENTS

| | | | |
|---|---|---|---|
| 2008/0189163 A1 | 8/2008 | Rosenberg et al. | |
| 2008/0215976 A1 | 9/2008 | Bierner et al. | |
| 2008/0235203 A1 | 9/2008 | Case et al. | |
| 2008/0243761 A1 | 10/2008 | Guo et al. | |
| 2008/0294651 A1 | 11/2008 | Masuyama et al. | |
| 2009/0077047 A1 | 3/2009 | Cooper et al. | |
| 2009/0083224 A1 | 3/2009 | Dettinger et al. | |
| 2009/0089044 A1 | 4/2009 | Cooper et al. | |
| 2010/0205180 A1 | 8/2010 | Cooper et al. | |
| 2011/0131210 A1 | 6/2011 | Bierner | |
| 2012/0131033 A1 | 5/2012 | Bierner | |
| 2013/0041921 A1 | 2/2013 | Cooper et al. | |
| 2013/0290342 A1 | 10/2013 | Cooper et al. | |
| 2014/0075004 A1* | 3/2014 | Van Dusen | H04L 41/04 709/223 |
| 2014/0324812 A1 | 10/2014 | Cooper et al. | |

FOREIGN PATENT DOCUMENTS

| | | |
|---|---|---|
| EP | 2084619 A2 | 8/2009 |
| EP | 2084619 A4 | 7/2014 |
| EP | 2021989 | 3/2016 |
| WO | 0004465 | 1/2000 |
| WO | 0188662 | 11/2001 |
| WO | WO 0188662 A2 * | 11/2001 |
| WO | 0235376 | 5/2002 |
| WO | 2007134128 | 11/2007 |
| WO | 2008022150 | 2/2008 |
| WO | 2008067316 | 6/2008 |

OTHER PUBLICATIONS

L.L. Bean Home Page, L.L. Bean, Inc., http://web. archive .org/web/20000229132929/http://llbean.com/, retrieved on Aug. 19, 2009], 2000, 1 page.

L.L. Bean Home Page, L.L. Bean, Inc., http://web. archive.org/web/200000229072041 /http://llbean.com/, retrieved on Aug. 19, 2009, 2000, 1 page.

L.L. Bean Home Page, L.L. Bean, Inc., http:/Iweb.archive.org/web/200000229033021/http://llbean.com/, 2000, 1 page.

U.S. Appl. No. 10/820,341, Final Office Action mailed on Jan. 29, 2010, 21 pages.

U.S. Appl. No. 10/820,341, Final Office Action mailed on Dec. 19, 2008, 24 pages.

U.S. Appl. No. 10/820,341, Final Office Action mailed on Jun. 7, 2011, 25 pages.

U.S. Appl. No. 10/820,341, Non-Final Office Action mailed on Apr. 1, 2008, 12 pages.

U.S. Appl. No. 10/820,341, Non-Final Office Action mailed on Jun. 23, 2009, 19 pages.

U.S. Appl. No. 10/820,341, Non-Final Office Action mailed on Oct. 13, 2010, 26 pages.

U.S. Appl. No. 10/820,341, Notice of Allowance mailed on Aug. 12, 2013, 12 pages.

U.S. Appl. No. 10/820,341, Notice of Allowance mailed on Oct. 15, 2013, 2 pages.

U.S. Appl. No. 10/820,341, Non-Office Action mailed on Mar. 18, 2013, 32 pages.

U.S. Appl. No. 11/382,670, Final Office Action mailed on Jan. 26, 2009, 23 pages.

U.S. Appl. No. 11/382,670, Final Office Action mailed on Feb. 19, 2010, 28 pages.

U.S. Appl. No. 11/382,670, Notice of Allowance mailed on Oct. 14, 2010, 18 pages.

U.S. Appl. No. 11/382,670, Non-Office Action mailed on Jun. 12, 2008, 18 pages.

U.S. Appl. No. 11/382,670, Non-Office Action mailed on Jul. 16, 2009, 24 pages.

U.S. Appl. No. 11/383,169, Final Office Action mailed on Jan. 7, 2009, 23 pages.

U.S. Appl. No. 11/383,169, Notice of Allowance mailed on Jun. 5, 2009, 14 pages.

U.S. Appl. No. 11/383,169, Notice of Allowance mailed on Oct. 19, 2009, 16 pages.

U.S. Appl. No. 11/383,169, Non-Office Action mailed on Jul. 9, 2008, 21 pages.

U.S. Appl. No. 11/422,827, Final Office Action mailed on Jan. 7, 2009, 22 pages.

U.S. Appl. No. 11/422,827, Notice of Allowance mailed on Jul. 30, 2009, 17 pages.

U.S. Appl. No. 11/422,827, Notice of Allowance mailed on Oct. 16, 2009, 18 pages.

U.S. Appl. No. 11/422,827, Non-Office Action mailed on Apr. 24, 2008, 14 pages.

U.S. Appl. No. 11/464,443, Final Office Action mailed on Jan. 13, 2009, 20 pages.

U.S. Appl. No. 11/464,443, Notice of Allowance mailed on Feb. 12, 2010, 22 pages.

U.S. Appl. No. 11/464,443, Non-Office Action mailed on Jun. 27, 2008, 12 pages.

U.S. Appl. No. 11/464,446, Advisory Action mailed on Feb. 24, 2012, 3 pages.

U.S. Appl. No. 11/464,446, Final Office Action mailed on Jan. 19, 2010, 40 pages.

U.S. Appl. No. 11/464,446, Non Final Office Action mailed on Jul. 22, 2013, 48 pages.

U.S. Appl. No. 11/464,446, Notice of Allowance mailed on Mar. 12, 2014, 10 pages.

U.S. Appl. No. 11/464,446, Notice of Allowance mailed on Nov. 8, 2013, 13 pages.

U.S. Appl. No. 11/464,446, Non-Office Action mailed on Apr. 30, 2009, 24 pages.

U.S. Appl. No. 11/464,446, Non-Office Action mailed on Jul. 6, 2011, 47 pages.

U.S. Appl. No. 11/464,446, Final Office Action mailed on Dec. 20, 2011, 53 pages.

U.S. Appl. No. 11/959,307, Final Office Action mailed on Nov. 22, 2010, 33 pages.

U.S. Appl. No. 11/959,307, Notice of Allowance mailed on Aug. 18, 2011, 16 pages.

U.S. Appl. No. 11/959,307, Non-Office Action mailed on Mar. 15, 2010, 30 pages.

U.S. Appl. No. 12/024,630, Advisory Action mailed on Mar. 21, 2012, 2 pages.

U.S. Appl. No. 12/024,630, Advisory Action mailed on Jul. 15, 2013, 4 pages.

U.S. Appl. No. 12/024,630, Final Office Action mailed on May 2, 2013, 19 pages.

U.S. Appl. No. 12/024,630, Final Office Action mailed on Jan. 9, 2012, 22 pages.

U.S. Appl. No. 12/024,630, Non-Final Office Action mailed on Mar. 26, 2014, 18 pages.

U.S. Appl. No. 12/024,630, Non-Final Office Action mailed on Jun. 20, 2011, 18 pages.

U.S. Appl. No. 12/024,630, Non-Final Office Action mailed on Nov. 14, 2012, 27 pages.

U.S. Appl. No. 12/766,183, Advisory Action mailed on Dec. 19, 2012, 3 pages.

U.S. Appl. No. 12/766,183, Notice of Allowance mailed on Mar. 1, 2013, 6 pages.

U.S. Appl. No. 12/766,183, Non-Office Action mailed on Jan. 19, 2012, 22 pages.

U.S. Appl. No. 12/766,183, Final Office Action mailed on Oct. 1, 2012, 30 pages.

U.S. Appl. No. 12/766,183, Terminal Disclaimer mailed on Feb. 7, 2013, 1 page.

U.S. Appl. No. 13/005,459, Advisory Action mailed on Mar. 2, 2012, 3 pages.

U.S. Appl. No. 13/005,459, Notice of Allowance mailed on Apr. 5, 2012, 12 pages.

U.S. Appl. No. 13/005,459, Notice of Allowance mailed on Jun. 22, 2012, 14 pages.

(56) References Cited

OTHER PUBLICATIONS

U.S. Appl. No. 13/005,459, Non-Office Action mailed on Apr. 13, 2011, 18 pages.
U.S. Appl. No. 13/005,459, Final Office Action mailed on Dec. 19, 2011, 26 pages.
U.S. Appl. No. 13/299,465, Advisory Action mailed on May 2, 2013, 3 pages.
U.S. Appl. No. 13/299,465, Final Office Action mailed on Oct. 2, 2013, 44 pages.
U.S. Appl. No. 13/299,465, Non-Final Office Action mailed on Feb. 26, 2014, 43 pages.
U.S. Appl. No. 13/299,465, Non-Final Office Action mailed on Jun. 14, 2013, 41 pages.
U.S. Appl. No. 13/299,465, Non-Office Action mailed on Aug. 16, 2012, 54 pages.
U.S. Appl. No. 13/299,465, Final Office Action mailed on Feb. 21, 2013, 45 pages.
U.S. Appl. No. 13/299,465, Terminal Disclaimer mailed on Apr. 22, 2013, 2 pages.
U.S. Appl. No. 13/929,157, Non-Final Office Action mailed on Dec. 18, 2013, 12 pages.
Baeza-Yates et al., Query Recommendation Using Query Logs in Search Engines, Current Trends in Database Technology—EDBT 2004 Workshops, Mar. 2004, pp. 588-596.
Chien et al., Semantic similarity between search engine queries using termporal correlation. In Proceedings of the 14th international conference on World Wide Web, Chiba, Japan. Session: Usage analysis, Retrieved from the Internet: <URL: http://www.ra.ethz.ch/CDstore/www2005/docs/p2.pdf>, May 10-14, 2005, pp. 2-11.
Don Clark, AnswerFriend Seeks to Sell Question-Answering Software, Wall Street Journal, Aug. 24, 2000.
Katz et al., Integrating Large Lexicons and Web Resources into a Natural Language Query System, To appear in Proceedings of the IEEE International Conference on Multimedia Computing and Systems, 1999, pp. 255-261.
Madhavan et al., Semantic Mappings for Data Mediation, retrieved from: pages.cs.wisc.edu/-anhai/talks/JayantMadhavan-Affiliates2002.ppt, Feb. 2002, pp. 1-17.
International Application No. PCT/US2001/15711, International Preliminary Examination Report mailed on Feb. 16, 2005.
International Application No. PCT/US2001/15711, International Search Report mailed on Nov. 6, 2001.
International Application No. PCT/US2007/068597, International Preliminary Report on Patentability mailed on Nov. 11, 2008.
International Application No. PCT/US2007/068597, International Search Report mailed on Jul. 1, 2008.
International Application No. PCT/US2007/075929, International Preliminary Report on Patentability mailed on Feb. 17, 2009.
International Application No. PCT/US2007/075929, International Search Report mailed on Mar. 12, 2008.
International Application No. PCT/US2007/085646, International Preliminary Report on Patentability mailed on Jun. 3, 2009.
International Application No. PCT/US2007/085646, International Search Report mailed on Jul. 23, 2008, 1 page.
Raghavan et al., Crawling the Hidden Web. Computer Science Department, Stanford University, 2001, pp. 1-25.
Storey et al., The Role of User Profiles in Context-Aware Query Processing for the Semantic Web, Proceedings of the 9th International Conference on Applications of Natural Language to Information Systems, Jun. 2004, 13 pages.
Yuret, Discovery of Linguistic Relations Using Lexical Attraction, PhD Thesis, MIT, May 1998, p. 1-56.
Yuret, Lexical Attraction Models of Language, Submitted to the Sixteenth National Conference on Artificial Intelligence, 1999.
Zaiane et al., Finding Similar Queries to Satisfy Searches Based on Query Traces, OOIS '02 Proceedings of the Workshops on Advances in Object-Oriented Information Systems, vol. 2426, 2002, pp. 207-216.
U.S. Appl. No. 13/299,465, Final Office Action mailed on Jun. 5, 2014, 43 pages.
U.S. Appl. No. 13/929,157, Final Office Action mailed on Jun. 2, 2014, 12 pages.
U.S. Appl. No. 13/929,157, Notice of Allowance mailed on Jul. 18, 2014, 10 pages.
U.S. Appl. No. 13/299,465, Notice of Allowance mailed on Aug. 21, 2014, 7 pages.
U.S. Appl. No. 14/328,454, filed Jun. 10, 2014, Non-Final Office Action mailed Aug. 10, 2015, 9 pages.
U.S. Appl. No. 14/328,454, filed Jun. 10, 2014, Notice of Allowance mailed Oct. 6, 2015, 17 pages.
U.S. Appl. No. 12/024,630, Final Office Action mailed on Oct. 1, 2014, 20 pages.
U.S. Appl. No. 11/464,446, filed Aug. 14, 2006.
U.S. Appl. No. 10/820,341, filed Apr. 7, 2004.
U.S. Appl. No. 13/299,465, filed Nov. 18, 2011.
U.S. Appl. No. 13/929,157, filed Jun. 27, 2013.
U.S. Appl. No. 12/024,630, filed Feb. 1, 2008, now abandoned.
Buntine et al., Multi-faceted Learning for Web Taxonomies, https://www.hiit.fi/u/buntine/swm02.pdf, Dec. 2002, 9 pages.
Christophides et al., Optimizing Taxonomic Semantic Web Queries using Labeling Schemes, http://repository.upenn.edu/cgi/viewcontent.cgi?article=1037&context=db_research, Feb. 2004, 22 pages.
European Application No. 07762070.6, Extended European Search Report mailed on Feb. 22, 2016, 7 pages.

\* cited by examiner

FIG. 6

IM Finance

Locations | Contact Us | Careers | Privacy

Home | Personal Finance | Business Services | Investing | Customer Service

You asked: How much can I contribute to an IRA? — 602

We have this answer to your question

IRA Contribution Table
Contribution amounts allowed for Traditional and Roth IRAs. — 604

| Tax Year | Under Age 50 | Age 50 and Older |
|---|---|---|
| 2001 | $2000 | $2000 |
| 2002-2004 | $3000 | $3500 |
| 2005 | $4000 | $4500 |
| 2006-2007 | $4000 | $5000 |
| 2008 | $5000 | $6000 |
| 2009 and Later | $5000 | $6000 |

Act Now — 606
- Develop a retirement savings plan
- Open an IRA online
- Transfer funds into an IRA account
- Rollover an employee plan into an IRA

Learn More — 608
- IRA
- Roth IRA
- Spousal IRA
- Educational IRA
- 401(K)
- Tax Relief Act of 2001

Here is additional useful information

IRA Comparison
Age Eligibility - Income Eligibility - Spousal IRA Eligibility - Annual contribution - Taxable distribution - Required distribution - Tax deductions - Benefits (more)

Tax Deductions and Deferrals
Your contribution to a traditional IRA is fully tax deductible in cases like... (more)

Highlighted Version : 10 Similar Answers — 610

Retirement Income Calculator
How a Roth IRA Could Increase Your Retirement Income — 612

Ask Another Question
Q: [____] Ask — 614

600

ONTOLOGY FOR USE WITH A SYSTEM, METHOD, AND COMPUTER READABLE MEDIUM FOR RETRIEVING INFORMATION AND RESPONSE TO A QUERY

CROSS-REFERENCES TO RELATED APPLICATIONS

The present application is a Continuation of U.S. application Ser. No. 10/820,341, filed on Apr. 7, 2004, entitled "ONTOLOGY FOR USE WITH A SYSTEM, METHOD, AND COMPUTER READABLE MEDIUM FOR RETRIEVING INFORMATION AND RESPONSE TO A QUERY," of which the entire disclosure is incorporated herein by reference for all purposes.

BRIEF DESCRIPTION OF THE INVENTION

This invention relates generally to information retrieval systems, and more particularly, this invention relates to an information retrieval system that uses an improved ontology with which to generate a response. As an example, an information retrieval system employs a question-matching language to generate a semantic index for retrieving content containing possible answers as well as forming a response. As another example, an information retrieval system uses one or more scoring techniques to select the most applicable of the possible answers, and to present the querier with these answers in an effective manner.

BACKGROUND OF THE INVENTION

Conventional search technologies have been helpful in guiding persons to possible sources of information that might contain answers they seek, but those technologies generally fail to do so in an effective manner. Traditional search mechanisms commonly overload users with many homogeneous sources of information such as hypertext links, electronic documents, etc. These sources may or may not contain the answer to the question sought, and if they do, the querier still has to examine each of those homogeneous sources (or portions thereof) to determine their relevancy to the user. And the longer it takes the user to acquire the answer sought, the higher the level of frustration and disappointment of the user.

To hasten the retrieval of the information likely to satisfy a querier, conventional search technologies have implemented a few common techniques to reduce the time to obtain an appropriate answer. One such technique employs document-level relevance, which is a measurement of the appropriateness of a document (on the whole) to a response of a particular query. As such, when a query is found to relate to a certain topic, a traditional search mechanism implementing document-level relevance retrieves one or more documents that best represents that topic. But with the advent of hypertext-based (e.g., Web-based) sources of information, classical document-level relevance has been modified in retrieval systems to perform link analysis when responding to queries. Link analysis examines the structure of the World Wide Web or enterprise Intranet and analyzes web page linkages from one to the next.

But while document-level relevance can be useful, there are significant drawbacks to a retrieval systems based entirely on this measure. First, typical retrieval systems using document-level relevance rely on the frequencies of either tokens or stems, and as such discard or otherwise ascribe de minimis value to "stoplisted" words. "Stoplisted" words are common words of a language, such as the English words "a," "and," "but," "because," etc. Since these words are generally not considered, syntactic or other linguistic information that otherwise can be used to hone a search is lost. Second, link analysis is effective only over a large number of links (e.g., collectively linking billions of unique web documents). But over a finite number of links, such as over thousands or millions of documents, link analysis is far less effective. Third, document-level relevance works well against short queries of general nature (e.g., one or two words), which are best answered by highly relevant documents. But it works poorly with specific or detailed questions, which are generally well-answered by a specific piece of text, even if the document from which the piece is taken is not relevant overall to the query.

Another conventional search technique uses ontologies in responding to natural language queries. An ontology is a set of "concepts," where one or more concepts are associated by a set of relationships. A concept is generally understood to be an idea or thought (e.g., in the mind) that represents some tangible of intangible entity in some world (i.e., some domain), where the actual entity in the real world is called the referent of the concept. The set of concepts is open; there is no bound to the number of unique concepts constituting an ontology, whereas the set of relations among concepts is closed because there are a limited number of unique relationship types. Each concept is typically linked to at least one other concept by at least one relation. Examples of concepts include "Chief Executive Officer," "houseplant," "crying," etc, and some examples of relations are "child-of," "member-of," "synonym-of," etc. But while the coverage and structural wealth of ontologies has increased dramatically, ontology use typically has not been fully developed.

As an example, consider a typical ontology-based search system that uses the following algorithm (or a variant thereof) to get an answer to a question. Once a query is received, the stopwords are stripped, which leaves the keywords as residue. Then, for each keyword, the system identifies a concept in the ontology. Next, from the relational position of each keyword concept in the ontology, the system follows a predefined traversal to reach a set of result concepts. Lastly, the system retrieves a number of documents containing the maximal set of result concepts from which to generate a response.

But while the classical use of ontologies is functional, there are several significant drawbacks. First, ontology-based retrieval systems are effective in obtaining the best answer only to the extent that the ontology covers the subject matter to which the query has been applied. These systems generally do not include concepts of the ontology that are attuned to match specific queries, such as unique vocabulary words, symbols, etc. Another drawback is that the classical ontology-based systems disregard linguistic cues, such as syntax. Without such cues, the response generated is not necessarily the best answer that the querier seeks. This is because a "one-method fits-all" technique (or algorithm) typically traverses only traditional ontologies thus either failing to retrieve the answer to some questions or retrieving incorrect answers for others.

In view of the foregoing, it would be desirable to provide a system, a method, and a computer readable medium for efficiently determining an answer to which a query seeks to elicit. Ideally, an exemplary system, method, and computer readable medium would minimize or eliminate at least the above-described drawbacks associated with prior art systems.

SUMMARY OF THE INVENTION

A system, method, and computer readable medium for applying one or more information retrieval technologies for resolving a query is disclosed. In one embodiment, an exemplary system generates a response using a language analysis module configured to parse a query into elements. This system can also include a rules engine configured to compare a condition of a rule against the elements, where the rule is configured to perform an action to retrieve information. Further, a response generator coupled to the rules engine receives the rule and retrieves the information for presentation to a querier in a portion of a display that adjusts proportionately to the degree of importance of the information.

In another embodiment of the present invention, an exemplary method for generating a response comprises establishing relationships between a concept and other concepts, where at least one of the other concepts is associated with a definition specific to an organization. Further, this method creates a semantic index that uses the concept for identifying information, parses a query into elements, where at least one of the elements is equivalent to the concept, and retrieves units of information using the semantic index. Also, this method can generate a plurality of portions of a display, each of which presents information based on the importance of a corresponding unit of the information.

According to the present invention, an exemplary information retrieval system has greater accuracy in responding to queries than traditional keyword-based search engines. When a querier, such as a customer, asks a question, the system analyzes the language patterns and concepts via a dictionary, such as a set of either rules or concepts, or both. The system also adds to query processing a contextual awareness of the question by using, for example, user profile and session information. Once the system understands the concepts and context of the question, the engine develops a strategy for finding, scoring, and displaying the best answer.

Even before the user enters a question, and further to a specific embodiment, the system typically creates a semantic index, which organizes all available content, along with the key concepts, meta-information, and existing relationships contained within the content. The system does this by importing all content in its original format and then parsing the structure of the documents. Then, it retrieves concepts from the multi-layered concept dictionary to create semantic representations (i.e., an index) of the relevant content. When new content is created or existing content is updated, the system can automatically update the index.

After building the search criteria, and with the semantic index created, the system can retrieve the best available answer. For this step, the system ranks the possible answers via its one or more scoring formulas, and then it retrieves the best answers from the semantic index. Next, the system formats best answers according to display parameters defined by criteria derived from one or more rules, and presents those answers to the user in a dynamic navigation user interface, or a display.

BRIEF DESCRIPTION OF THE FIGURES

The invention is more fully appreciated in connection with the following detailed description taken in conjunction with the accompanying drawings, in which:

FIG. 6 illustrates a screenshot exemplifying a dynamic navigation user interface ("DNUI"), according to an embodiment of the present invention;

Like reference numerals refer to corresponding parts throughout the several views of the drawings.

DETAILED DESCRIPTION OF THE INVENTION

Figure 1A:
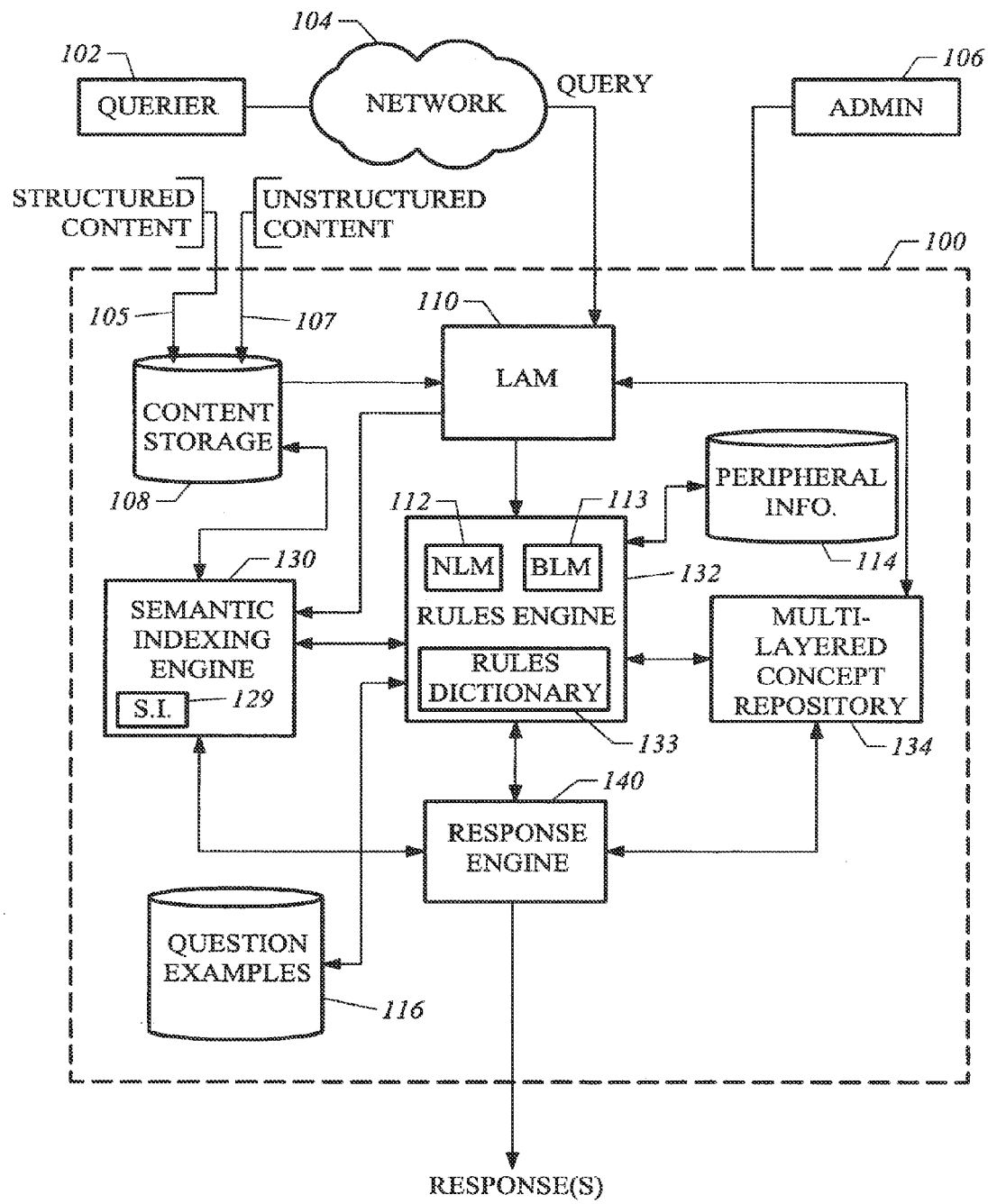
FIG. 1A is a block diagram illustrating an exemplary information retrieval system ("system") for formulating a response to a query in accordance with an embodiment of the present invention.
Figure 1B:
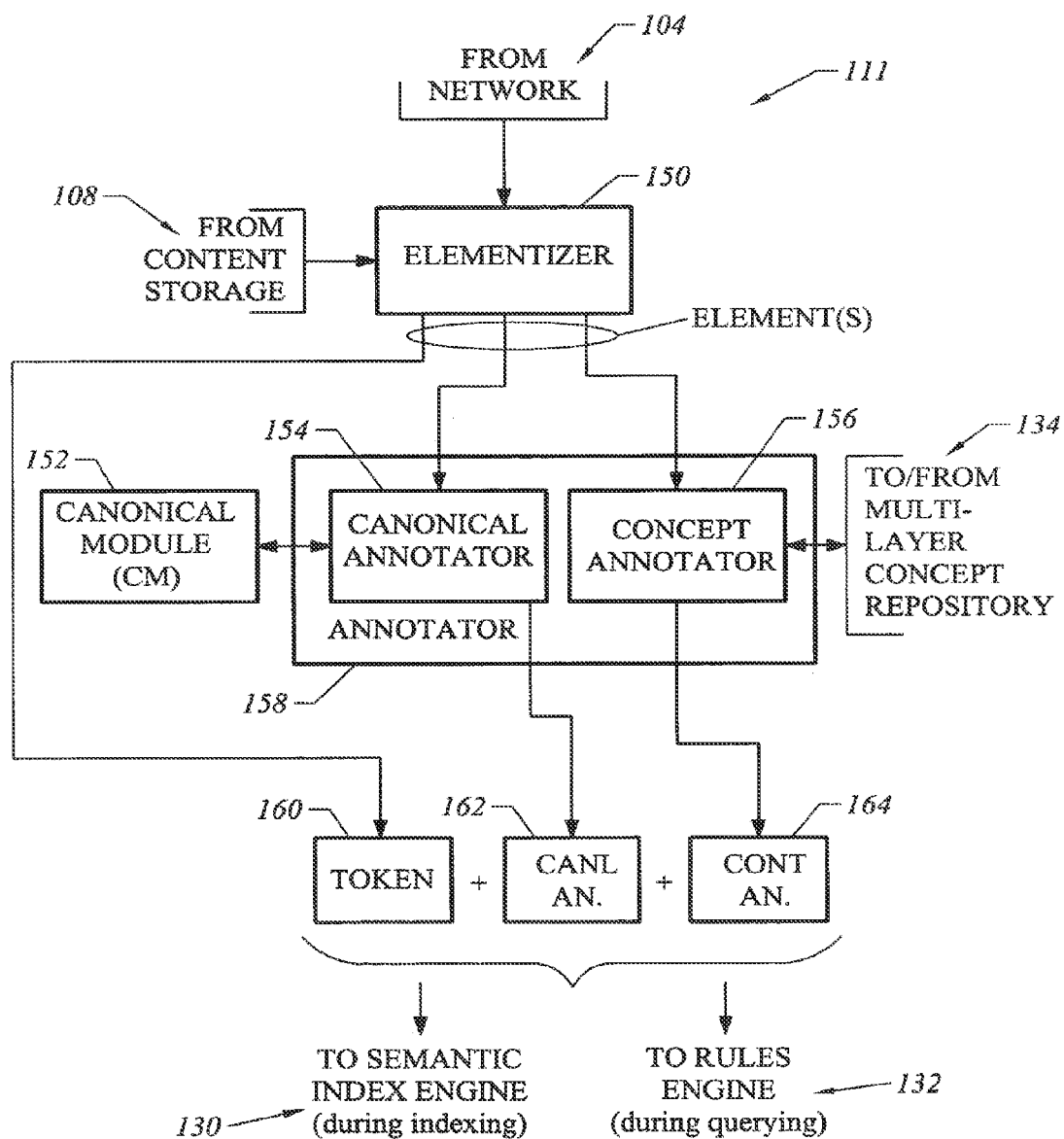
FIG. 1B is a block diagram illustrating an exemplary language analysis module ("LAM") in accordance with an embodiment of the present invention.

FIG. 1A is a block diagram illustrating an exemplary information retrieval system ("system") 100 for formulating a response to a query in accordance with an embodiment of the present invention. To formulate such a response, a querier 102 applies questions in natural language via a network 104 to system 100 (questions can include requests for information). Although querier 102 is typically a human interacting with a user interface of a computing device, (any computer having a processor and memory for executing program instructions) querier 102 can be any mechanism designed to solicit information, such as a computing device programmed to automatically form and submit queries to system 100. Network 104, which is optional, can be the Internet, a local area network ("LAN"), or any type of communications network capable of communicating data that represents both questions to and answers from system 100. Network 1004 can facilitate any known types of question-answering communications, such as real-time communication between two users via computer (e.g., "chat"), email, voice, etc. Further, system 100 is accessible by an administrator ("admin") 106, which can be a user interfacing with a computing device, to configure the operation a system 100. As an example, admin 106 instructs system 100 to preprocess content from which information will be indexed and later used to process questions and to retrieve answers, or admin 106 assembles a software program using a question-matching language similar to that described below. System 100 can be composed of one or more computers, each having at least one processor and memory for executing program instructions in accordance with the present invention.

System 100 operates in two modes: "indexing mode" and "query mode." In indexing mode, constituent elements of system 100 operate to extract text from any source of text, such as a body of textual content. Then, system 100 can index that text for retrieval. In query mode, one or more questions are analyzed against a set of one or more rules, with a response formed by using text indexed during the indexing mode, in whole or in part. These two modes are discussed below. Structurally, system 100 includes a language analysis module ("LAM") 110 communicatively coupled to content storage 108, a multi-layered concept repository 134 and a rules engine 132. System 100 also includes a semantic indexing engine 130 and a response engine 140, both of which are coupled together for communicating with each other as well as with rules engine 132 and multi-layered content repository 134. In general, language analysis module 110 transforms free-text into segments of text elements, where elements form tokens (i.e., either as one or more words) and segments include any string of elements (e.g., sentences, paragraphs, chapters, documents, etc.). In both indexing mode and query mode, LAM 110 transforms text into elements, which then can be annotated with additional information for enhancing the information retrieval process of the present invention. In indexing mode, the elements and associated annotations generated by LAM 110 are used to form an index, such as semantic index 129. In query mode, the elements and associated annotations are transported to rules engine 132, where either an element or an annotation, or both, are recognizable as satisfying a rule condition by rules engine 132. And if an element and/or annotation (depending on the rule) matches a condition of a rule contained in rules dictionary 133, then an action is taken by other elements of system 100 for further response generation. Again, an element can be composed of any combination of symbols that constitute a token (e.g., a word) or a portion thereof (e.g., a word, if a multi-worded token), one or more segments, a phrase, a concept, etc. Free-text originates from any source of text that is either structured (e.g., as from a database) or unstructured (e.g., text generated as a result of voice recognition software converting spoken language to written language), where free-text can include text of any type of character, such as alphanumeric or otherwise, and of any language, etc.

In processing a query during query mode), system 100 uses multi-layered concept repository 134 as a hierarchical dictionary or set of relationships for determining associated concepts that are relevant in determining an answer based on the elements of the query. Rules engine 132 is configured to generate a number of actions specified by rules that are triggered by matched elements, these actions define search criteria upon which response engine 140 is to operate. In turn, response engine 140 selects the most appropriate responses to present to querier 102. To do so, response engine 140 uses semantic index 129 to locate and to extract information from content storage 108, the content of which is typically formed during the indexing mode. Then, response engine 140 determines how best to present the extracted information as an appropriate response.

The following discussion describes the functionality and/or structure, according to a specific embodiment of the present invention, of the elements of exemplary system 100, each of which can be composed of either software or hardware, or both. In query mode, language analysis module 110 is configured to receive at least one query and to format natural language-based queries into elements and/or annotations for satisfying language ride conditions. Along with these elements and/or annotations, contextual information from peripheral information repository 114 is provided to rules engine 132. Contextual information includes peripheral information (other than the query itself) that is used to prepare a response by satisfying business conditions of a rule. When satisfied, these language and business conditions cause one or more rules of rules engine 132 to fire (i.e., execute), thus invoking at least one action to generate the response.

FIG. 15 illustrates a functional block diagram of an exemplary language analysis module ("LAM") for implementing LAM 110 of FIG. 1A, according to an embodiment of the present invention. LAM 111 of FIG. 15 is configured to parse through text (e.g., strings of characters) to generate elements. Exemplary LAM 111 includes an elementizer 150 coupled to an annotator 158, which is configured to form canonical annotations ("Canl. An.") 162 and concept annotations ("Cont. An.") 164. Elementizer 150 is configured to receive an input stream of text from either querier 102 during query mode or content storage 108 during indexing mode. According to one embodiment, elementizer 150 forms elements through known tokenization processes that form "tokens" as the elemental units of text corresponding to one or more words in a text stream. Specifically, elementizer 150 can implement any suitable tokenization processes, such as a "change-based tokenization" process, whereby a degree of character-to-character change in the text stream demarcates tokens (e.g., the text "the 87zf" is separable into the following three tokens: 'the', '87', 'zf').

Elementizer 150 provides generated elements from text to annotator 158. In this example, a canonical annotator 154 is configured to determine a canonical form of that element and to provide that canonical form as an annotation. A canonical form of a word typically refers to one or more morphological variations in wordform, punctuation, etc. Canonical annotator 154 provides an element to canonical module ("CM") 152, which processes that element and returns its canonical form. For example, if element "swimming" is generated by elementizer 150 and passed to canonical annotator 154, then CM 152 will be expected to return the base word, or stem, "swim." In some embodiments, CM 152 can reside either within or without LAM 111, or both. Further to this example, a concept annotator 156 performs a similar operation, but instead matches a generated element against ontology-based concepts stored in multi-layered concept repository 134. For example, if element "cat" is generated by elementizer 150 and passed to concept annotator 156, then multi-layered concept repository 134 might be expected to return the concept <noun.anmainal.cat>. Such a concept annotation could be used by System 100 to link the element "cat" to a higher-layered concept (e.g. a genus term), such as "animal," In at least one embodiment, annotator 158 includes any other like annotators, similar to canonical annotator 154, but useful for providing additional information to facilitate the information retrieval process.

For one or more elements forming a token 160 (e.g., one or more words), LAM 111 can generate one or more canonical annotations 162 and/or concept annotations 164 for that token. Token 160 and corresponding canonical annotations 162 and/or concept annotations 164 are provided either to semantic index engine 130 during the indexing mode or to rules engine 132 during the query mode, in the form of a data structure suitable for associating tokens and annotations, for example. Further to the previous examples, an input element of "swimming" input into LAM 111 will yield a token "swimming" annotated with "swim" (e.g., [swimming]+[swim]). Similarly, an input element of "cat" input into LAM 111 will yield a token "cat" annotated with the (animal) cat concept (e.g., [cat]+[noun.animal.cat]). As these annotations provide additional information with which to evaluate rules while analyzing a query, then additional rule conditions can be implemented so as to finely tune the execution of rules based on that additional information. Also, these annotations provide additional information to retrieve content with which an answer will be formulated in query mode. As discussed previously, LAM 110 of FIG. 1A is coupled to multi-layered concept repository 134, which is described as follows.

Multi-layered concept repository 134 is a data structure for implementing an "ontology", according to one embodiment of the present invention, as a relatively large data structure that contains a set of concepts, each of which are linked together by a set of relationships. These relationships, which are mostly linguistic in nature, can describe alternative concepts that are synonymous with that particular concept. Or, these relationships can describe the other alternative concepts as being more general, more specific, a "part-of," etc., to that of the concept under consideration. The ontology encodes knowledge of a particular universe or domain and is divided into varying layers of specificity as to the field of knowledge. During a user's query, system 100 identifies concepts from the ontology and maps them from the ontology of multi-layered concept repository 134 to the user's query (at question time; in query mode). Typically, all (or most concepts in the ontology map to at least one word or phrase in natural language, with many concepts mapping to multiple natural language strings. As an example of an ontology, consider that a "financial services"-based ontology contains concepts: <money>, <IRA>, <fund>, <cash>, etc., where each of these concepts are connected by any number of relationships to other concepts in the ontology. That is, a concept "<dollar_bill>" is connected via a "type-of" relationship to the concept "<cash>." As used throughout, the term "concept" refers' to a group of semantically clustered entities, examples of which include: "<shoe>," "<financial institution>," "<swimming>," etc. An exemplary method of constructing and/or representing a concept is depicted in FIG. 2, according to an embodiment of the present invention.

Figure 2:
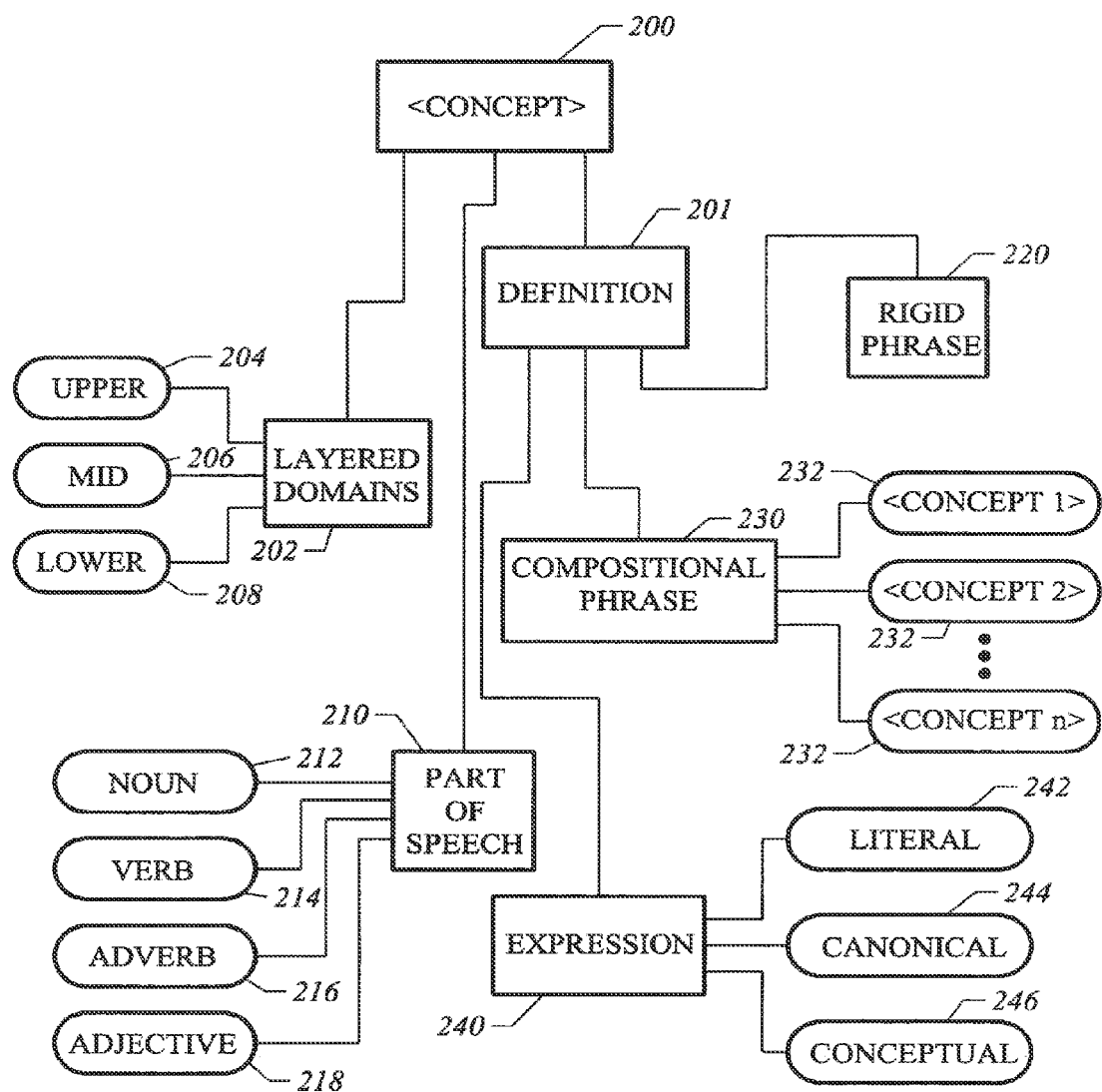
FIG. 2 is a block diagram illustrating a method of constructing a concept to associate various types of information, according to one embodiment of the present invention.

FIG. 2 is a block diagram illustrating a method of constructing a concept 200 to associate various types of information, according to one embodiment of the present invention. <Concept> 200 is associated with one or more layered domains 202 and parts of speech 210. Further, it is defined ("definition") 201 as a rigid phrase 220, a compositional phrase 230 or an expression 240. One or more layered domains 202 are related to <concept> 200. For example, at a lower layer ("lower") 208, a concept can be defined in terms of general language information (e.g. ordinary words of a natural language, such as English). At this most basic level, the native language of an organization is defined. For English-speaking companies, for example, these concepts relate to or include definitions, synonyms, acronyms, antonyms, abbreviations, etc.

But at a mid-level layer ("mid") 206, a concept can be defined in more specific terms (e.g., such as industry-specific terms or concepts that are not normally defined in English dictionaries). Examples of mid-level layer concepts can be found in the financial, telecommunications, and high-technology market segments. For instance, in the automobile industry, this layer includes words and concepts associated with braking distance, curb weight, horsepower, steering radius, body panels, doors, steering wheels, glove compartments, etc. Some words may have different meanings in different market segments. For example, "drive" has one meaning in the context of computers, and another meaning in the context of automobiles. By providing meanings for words specific to the context in which they are used, the mid-layer of the ontology serves to disambiguate certain terms to their contextually appropriate meanings.

At an upper layer ("upper") 204, a concept can be defined in its most specific terms (e.g., such as using terms known and/or created internally for an organization or company specific information; these terms are not normally known external to a specific organization). Examples of upper layer concepts 204 are product names, model numbers, company-specific acronyms, etc. Correspondingly, an ontology associates each concept with one of these three (or more) layers. The relationships between multiple concepts can exist both within and between layers. For instance, the "is-a" relationship may link <concept> 200 as a concept in an industry layer (for instance, if <concept> 200 defines <sport utility vehicle>) to models of car in a company layer (for instance, another concept defines that concept as <Honda Element>) So, if an element is determined to be equivalent to a concept residing in one of the layers of multi-layered concept repository 134, then other related concepts in layers are available to match against the language conditions of any rule in rules dictionary 133.

<Concept> 200 is also associated with and classified as one of four parts of speech 210, such as a noun 212, a verb 214, an adjective 216, or an adverb 218. Further, <Concept> 200 is defined in at least one of three ways. First, <concept> 200 can be defined as a rigid phase 220, where a rigid phrase is matched by any punctuation and/or inflectional variant of that rigid phrase. For example, a noun concept for <hot_dog> is defined with the rigid phrase "hot dog," which is matched by the phrases "hot dog," and "Hot Dogs" in the user's query. Also, rigid phrase 220 will match those inflectional variants that are appropriate for the concept's part of speech. For example, a noun (i.e., noun 212 put of speech) concept containing "swim" as rigid phrase 220 will match "swims," but not "swimming." By contrast, the verb concept (i.e., verb 214 part of speech) containing "swim" as rigid phrase 220 will also match "swimming" and "swam."

Second, <concept> 200 can be defined as a compositional phrase 230, which is a set of concepts 232. Any matching concept 232 of this set should match each element at least once, but in no particular order. That is, one of concepts 232 can occur adjacent to another, or can be separated by any number of stopwords. For example, the concept 200 "<financial_institution>" is defined as compositional phrase 230 and is defined by the set of concepts {<finance>, <institution>}. For any string of elements to match compositional phrase 230 "<financial_institution>," the string must contain both the term "financial" (or its synonym or variant) and the term "institution" (or its synonym or variant, such as "organization" or "corporate entity"). As such, set of concepts 232 will match phrases such as "house of finance," "money institution," and "financial institution," even if the concept <house> is separated from the concept <finance> by the stopword "of," as is the case of the first example. Note that in some cases concepts are defined by stopwords, where such stopwords are used to match elements. Note also that a stoplist used for the purposes of defining compositional phrases may differ from the stoplist used elsewhere in system 100.

Third, <concept> 200 can be defined as an expression 240, such as a regular expression of any type of regular expression language. An example of such a language is presented in Appendix I. In one embodiment, expression 240 can be defined by various types of base expressions for matching words and phrases as literal character strings ("literal") 242, as canonical forms that include variations in wordform and punctuation ("canonical") 244, and/or as concepts that include semantic relations ("conceptual") 246 as defined by an ontology implemented as multi-layered concept repository 134.

<Concept> 200 as literal expression 242 will match against only an exact specified character string. Literal expressions 242 are sensitive to case, punctuation, spacing, etc., and can be specified by enclosing the word or phrase within double quotes, such as "some string," But if <concept> 200 is defined as canonical expression 244, then any variations in inflection or form, such as capitalization, tense, or other valid morphological variations, will match the specified string. Canonical expression 242 can be specified by either (1) a non-quoted string beginning with an upper- or lower-case letter, succeeded by any alphanumeric characters, with no punctuation or spaces, or (2) any alphanumeric string enclosed within single quotes, including punctuation and spaces. For example, the expression 'cat' matches Cat, cats, Cats, cat's, and cat, but not catalog. Last, <concept> 200 can be defined as a conceptual expression 246 to match occurrences of a specified concept and any of its synonyms. Again, concept references can be specified by the concept name within angle bracket. For example, <concept> 200 can be identified using three identifiers, separated by periods: <pos.domain.headword>, where: "pos" specifies the concept's part of speech, "domain" specifies the domain to which the concept is assigned (e.g., upper, mid, lower, or any other layer), and "headword" specifies the concept headword, which indicates the collection of specified synonyms and other relationships that define <concept> 200. For example, the expression "<noun.animal.cat>," as conceptual expression 246, matches Cat, cats, and even kitten (as kitten is a concept subordinate to either animal or cat, or both), but not catalog.

In one embodiment of the present invention, system 100 can "clone" concepts. That is, the definition of a concept may inherit from another concept. And as such, when concepts undergo modifications when used in different domains (e.g., fields of knowledge, or industry sectors), these modifications typically include changes in their synonyms, relations with other concepts, and even morphological-syntactic properties. Concept cloning thereby provides a mechanism to state domain-dependent modifications while maintaining the identity of the concept. This results in keeping the total inventory of concepts relatively small. Note that the cloned concepts in a higher layer (e.g., more specific industry sector or single company) will generally over-ride same-named concepts (i.e., as a clone) in a lower layer (such as the base English dictionary or a lower industry domain).

Figure 3:
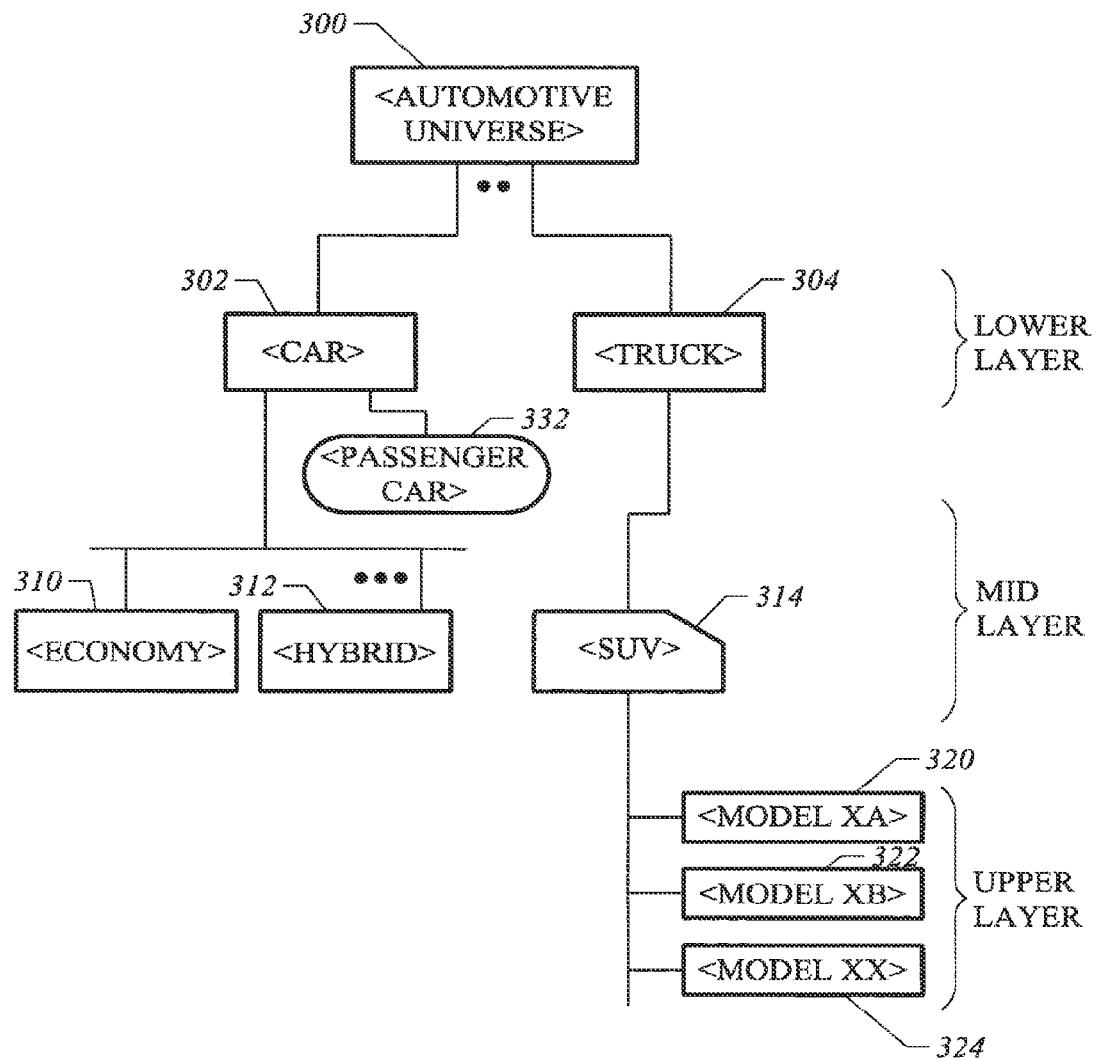
FIG. 3 illustrates a portion of a data structure that relates exemplary concepts in an ontology, according to one embodiment of the present invention.

FIG. 3 illustrates a portion of a data structure that relates concepts in an ontology, according to one embodiment of the present invention. Concept <automotive universe> 300 represents the domain to which the exemplary ontology relates. That is, the concepts and relationships shown in FIG. 3 are of, and relate to, automobiles. A lower layer set of concepts include <car> 302 and <truck> 304, both of which are commonly understood to be words generally known. Although these and other concepts of FIG. 3 are shown without parts of speech 210 or definition 201, concept 302 can be definable as compositional phase ("<passenger car>") 332. A mid layer set of concepts are <economy> 310, <hybrid> 312, and <SUV> 314, each of which are well-known terms and concepts in the automotive industry, across many or all manufacturers. An upper layer set of concepts are <Model XA> 320, <Model KB> 322, and <Model XX> 324, each of which represents a concept (and term) that is unique to a specific manufacturer of sports utility vehicles ("SUV"). So, given any query expressed in words or elements that relate to lower layer concepts, a more specific answer or response can be formulated by using the relationships shown in FIG. 3. For example, a querier requesting a price of an "SUV" generally can be presented with a specific response including price information for Models XA, XB, and XX.

Referring back to FIG. 1A, content storage 108 is formed as a pool of information from which to formulate a response, according to a specific embodiment of the present invention. Content storage 108 is established during an indexing mode of system 100, which is typically before a query (and its query elements) can be matched against the contents of multi-layered concept repository 134. Semantic indexing engine 130 operates to first discover constituent information of this pool by processing sources of information (i.e., content), and then to associate and store identifiers to each piece of content in semantic index ("S.I") 129 which enables relatively quick retrieval of relevant sources of information. S.I. 129 organizes available content, along with the concepts, meta-information (data describing the concepts, including parts of speech, etc.), and existing relationships to other concepts.

Semantic indexing engine 130 discovers sources of information by first importing content in its original format. System 100 imports content by acquiring and storing a copy of content into content storage 108. During content acquisition, structured content 105 and unstructured content 107, as well as combinations thereof, are imported into content storage 108. Examples of structured content 105 are data retrieved from relational databases, etc., whereas examples of unstructured content include HTML documents, XML documents, Microsoft Word® documents, text files, Power Point™ presentations, etc. In some cases, system 100 imports web page content by "crawling," whereby semantic indexing engine 130 acquires such content by specifying a starting point to discover content, and then recursively follows discovered links within that content.

To form semantic index ("S.I.") 129, semantic indexing engine 130 parses the structure of the documents stored in content storage 108 and receives annotations, such as concepts, via LAM 110 (i.e., indirectly from multi-layered concept repository 134), to create and to index semantic representations of the relevant content. These semantic representations can be associated with either tokens or annotations (e.g., concepts), or both, such that an individual word in a document (e.g., HTML document or otherwise) may be indexed either both as a token and an annotation, or as one or more multiple annotations (e.g., concepts, canonical forms, etc.). With the resulting index, S.I. 129, semantic indexing engine 130 is able to quickly identify occurrences of a given concept or token within the content in relation to other concepts and tokens.

In one embodiment, semantic indexing engine 130 creates S.I. 129 as an inverted index for referring to content. As such, system 100 can evaluate an expression (as a regular expression, such as an IML, expression) against this index. In an exemplary index, one or more segments stored in content repository 108 from which any token or annotation was derived can be identified by known indexing techniques. That is, either a token or an annotation, or both, can be used to search the index for quick retrieval of the relevant segments (of any size or scope) of content. Such an index can have the forms of <"token," document identifier>, <"canonical annotation," document identifier>, and <"concept annotation," document identifier>, etc., where the first argument is a key with which to match a query element against and the second argument is the location of the content to which the key refers. For example, consider that a particular web page advertises automobiles for sale, and specifics a car valued in U.S. dollars (e.g., $35,000). Upon extracting content from that web page, element "$35,000" will be generated by LAM 110 during the indexing process. Also during that process, LAM 110 derives concept annotation "<U.S. dollar amount>" for token "$35,000," such that either of these (i.e., dollar amount and $35,000) are keys with which to search and retrieve content from that web page. So, in a subsequent query that asks how much a car costs on the web page, entries in S.I. 129 having <U.S. dollar amount> as a key can be searched against to retrieve content during the query mode.

In accordance with a specific embodiment of the present invention, semantic indexing engine 130 is configured to automatically (and periodically) discover new content and update content storage 108 with the newly discovered content. Also, S.I. 129 can be automatically updated to reflect availability to that new content. In some embodiments, the ontology embodied in multi-layered content repository 134 can be extended automatically based on the indexed content. By using lexical patterns to identify the occurrence of acronyms and other terms unique to a particular set of content, semantic indexing engine 130 can add newly formed concepts into multi-layered content repository 134 for use with later queries. In one embodiment, semantic indexing engine 130 creates S.I. 129 for referring to content that will be used to formulate an answer. As described below, system 100 can evaluate an expression (as a regular expression, such as an IML expression), especially against this index. When evaluating such an expression, rules engine 132 generally identifies a set of documents as well as ranges of tokens for documents to which the expression relates. For example, a simple query including the concept "<noun.artifact.car>" results in retrieving all ranges of tokens in all documents that contain this concept. These ranges are used to match against the keys of the index when searching for content. Consequently, S.I. 129 provides a fast and flexible way to retrieve concept, stem, token occurrences in content copied into content storage 108.

Once content is loaded into content storage 108, then semantic indexing engine 130, rules engine 132 and response engine 140 can collectively-form a response for presentation to a querier. Generally, rules engine 132 is configured to build search criteria for generating any number of candidate answers (if an answer can be acquired from content in content storage 108.) Response engine 140 is configured to receive possible answers and rank them, for example, via one or more scoring formulae. From this determination, response engine 140 retrieves the best candidate answers using semantic index 129. The following describes exemplary functionality of rules engine 132 and response engine 140, individually and combined, in generating a response to a query.

As described previously, rules engine 132 is configured to receive and process elements and/or annotations as language conditions, as well as business conditions. The language conditions are derived from a query submitted to system 100 in a natural language and business conditions arise from data (e.g., from peripheral information repository 114) that describes the context of the query, including information about the querier. In processing a query, rules engine 132 determines whether a rule in rule dictionary 133 specifies any of these conditions. Once all of the conditions of a rule are satisfied, then rules engine 132 will initiate a rule action (i.e., the rule "fires") that contributes to the formation of a response. These collective actions are response criteria that rule engine 132 inserts into a list of the actions, which is sent to response engine 140.

Rules dictionary 133 includes a set of rules for identifying what aspects of a question should be addressed in an answer as well as how best to form and present the answer to the querier. These rules provide a high-level control mechanism that governs the reaction of system 100 to a user's query. Any suitable regular expression language can be used to specify rule conditions and actions, where the actions are contingent on matching words, phrases, and concepts in both user requests and sources of information (i.e., content of content storage 108). This set of rules can be composed of any number of rules and rule types that are designed to elicit a specific action upon satisfying a particular combination of conditions. The following discusses the conditions of rules that, when satisfied, cause those rules to fire or execute.

One type of language condition of a rule is a question pattern, which is a grouping of various words and/or phrases used to match against expressions associated with the rules, where such words and phrases are composed of elements derived from LAM 110. The expressions to which the question patterns are to be matched can be formed using any regular expression language that is capable of capturing the possible variations in language constituting a request. An ordinarily skilled artisan should appreciate that regular expression languages facilitate searching and matching characters strings against a particular pattern text defined by a specific regular expression. Typically, a regular expression language comprises at least two basic character types: literal text characters normal characters including upper and lower case letters and digits) and metacharacters (e.g., a wildcard symbol, such as "?," or symbols, to match any single character or word), both of which are employed to express a formula for matching patterns of text. According to a specific embodiment of the present invention, the InQuira Matching Language ("IML"), which has been developed by InQuira. Inc. of San Bruno, Calif., is a suitable regular expression language. IML is described in Appendix I. IML is a regulars expression language designed to match elements against questions, sentences, documents, or any other body of textual content, and can be used to match certain user intents (when matched against the user's question), or to match documents containing specific terms (when matched against answer content). An IML expression may refer to tokens, to stems, to concepts, or the like, and can use any number of wildcard symbols in reference to characters (as is typical practice) or to reference tokens, stems, or concepts.

Another type of language condition of a rule is a question element. Question elements are a pre-determined list of natural language phrases, sentences, and questions that are specified in plain language for matching (or excluding from matching) any set of elements or tokens that are part of a query. According to one embodiment a natural language module ("NLM") 112 of rules engine 132 is configured to match (or not match) one or more tokens against a predetermined list of question examples. NLM 112 can process the one or more tokens at a lower level, such as using word recognition, morphology, sentence detection, etc., to classify user questions into a group that can be matched (or excluded from being matched) against those one or more tokens. A list defines exemplary questions as they would be entered by users. This list forms a range of valid questions to which rules engine 132 matches these elements. Typically, a rule specifies both the questions that should match, and the questions that should not match. During query processing, rules engine 132 can use any known statistical methods to evaluate user queries and information requests against the list of example questions. In some cases, an action is performed in response to a match. For example, the question "what time do you close?" can trigger a certain rule that retrieves a prepackaged (i.e., "managed") answer from a cache (e.g., content storage 108) containing answers to "frequently-asked questions". Upon determining that a match exists, rules engine 132 will communicate this to response engine 140, which prepares a response as a managed answer. In one embodiment, question examples are typically added to a list by admin 106 of FIG. 1A as a condition to a rule, where the list can be stored in repository such as question examples 116 coupled to rules engine 132.

Again, system 100 uses "question examples" to define a condition of a rule. Given a set of question examples, the rule will fire if a user's question is the same or at least similar enough to those question examples. "Positive question examples" are those sets of words that when matched will cause a rule to perform a certain action, whereas "negative question examples" are those examples of questions that are designed not to match. That is, a rule expressing a negative question example will refrain from taking action upon a match with a negative question example. In this latter case, the condition can be met if a user's question is similar enough to the positive examples, but dissimilar enough to the negative examples. Note that system 100 typically does not allow a negative question example to be identical to any positive question example.

In operation, when a user submits a question. NLM 112 determines whether the set of positive and negative question examples should allow the user's question to match or not to match. To make this determination, system 100 examines the concepts (e.g., non-stoplisted) that occur both in the user's question and the question examples. The ontology of multi-layered concept repository 134 can be used to determine whether the user's question is identical to, or shares a common ancestor with, one of the question examples by using a configurable number of generations with which to test common ancestry. For example, first suppose there is a simple example question comprising the single word "car," which has then been associated by system 110 (via LAM 110) to the concept <noun.artifact.car>. Next, suppose that the user's question during a query mode is the single word "truck," which has been associated with the concept <noun .artifact.truck>. Because these two concepts share a common ancestor <vehicle>, these two questions can be considered a match, provided that concept <vehicle> is within the configured number of links (i.e., relationships) from both <car> and <truck>.

For question examples, the user's question will generally match if two conditions are met: (1) a relatively high enough proportion of questions within the user's question match or share a common ancestor with any of the positive examples, and (2) there is a low enough proportion of concepts which match or have common ancestry between the user's question and the negative example questions.

Further to the language condition is the business condition. According to one embodiment a business condition module ("BCM") 113 of rules engine 132 is configured to match peripheral information against one or more business conditions. Business condition module ("BCM") 113 acquires peripheral information for use by system 100 to provide a context in which a query has been initiated. This peripheral information can include a profile of the querier, including past questions and answers, time at which query was initiated (thus providing context to retrieve information that may be time-sensitive), session information, a web page and/or content with which the query coincides, etc. For example, if the querier is a financial account holder inquiring how to close his or her account, a rule can specify "if account holder requests information about closing account, then take action," where the levels of action can depend on the amount in the account (e.g., premium account holders will receive a personal call, whereas a standard account holder will just be sent requested information to close account). When rules engine 132 determines that a specific unit of peripheral information satisfies a business condition of a rule, then a corresponding action can commence. Generally, rules engine 132 evaluates the language conditions only for the rules whose business conditions are evaluated as true, thus minimizing computational overhead.

Consider the following example of using a regular expression language (e.g., IML) to first match a question and then present a particular managed answer. Suppose a financial site wishes to promote alternative investment options to certain customers. This can be done through a rule with a "managed answer" action. The IML "question patterns" expressions for such a rule could be: <noun.topic.finance> OR <noun.finance.investment>, for example, to match any question which refers to either financial investments or finance in general, or both. This rule can also specify a "business condition" component.

Figure 4A:
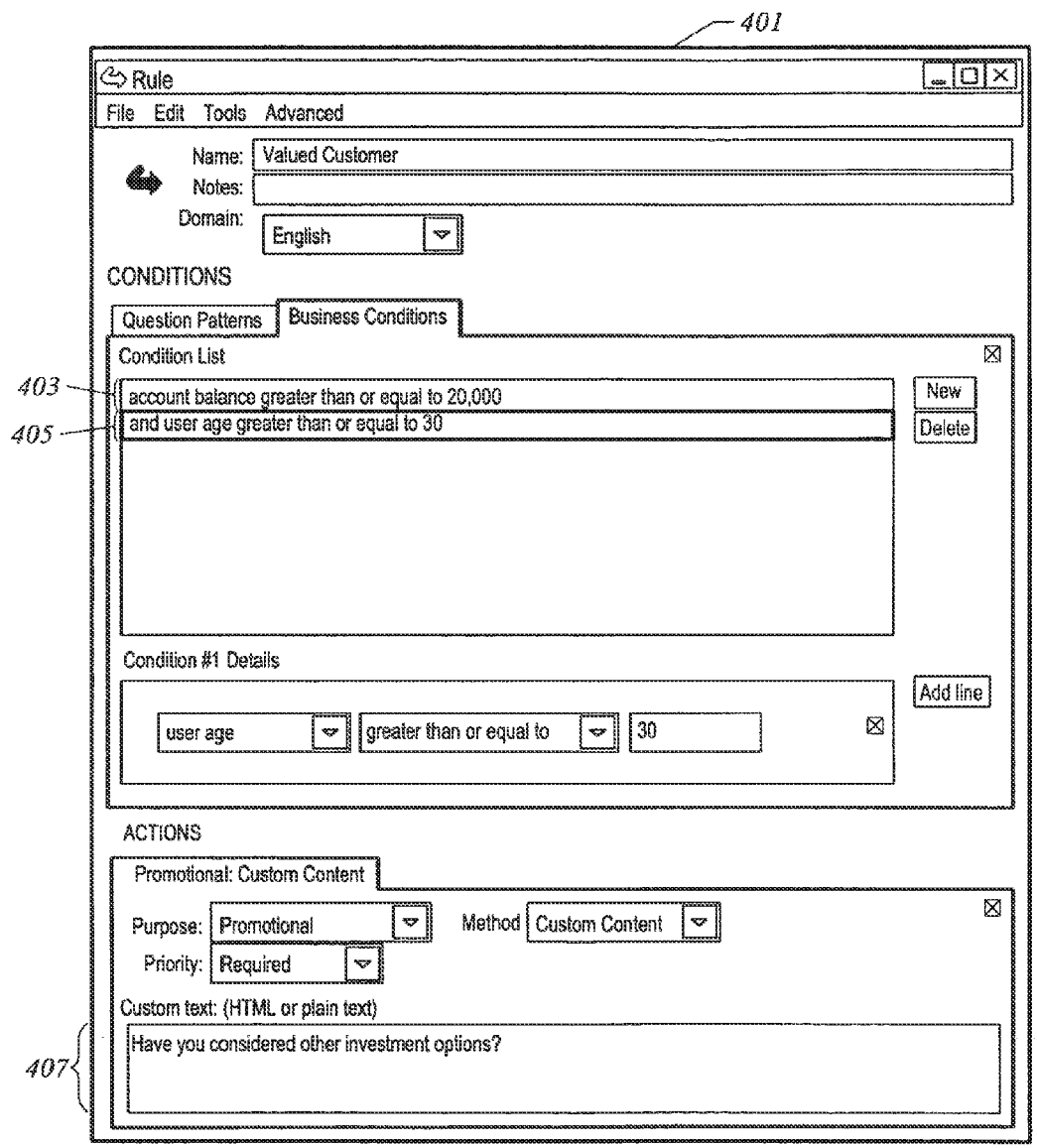
FIG. 4A illustrates an exemplary screenshot for implementing a managed answer for an exemplary business condition, according to an embodiment of the present invention.

FIG. 4A illustrates an exemplary screenshot for implementing a managed answer for an exemplary business condition, according to an embodiment of the present invention. Rule management tool 401, which is shown as a screen shot of a user interface, provides admin 106 a mechanism for setting business conditions 403, 405 so that if satisfied, the rule will provide an action as a "managed action" 407. So, in this example, if querier 102's account balance is equal to or greater than $20,000 (business condition 403) and querier 102 has aged to a year equal to or greater than 30 years old (business condition 405), then the rule will initiate action described in the custom content field 407, which is the "action" portion of this rule. That is, the message "Have you considered other investment options?" will be presented to querier 102 when both of the rule conditions 403, 405 are met.

To thoroughly match the elements provided to rules engine 132 by language analysis module 110, rules engine 132 matches those elements against the contents of multi-layered concept repository 134 to examine whether there are additional ways of expressing one or more elements. This broadens the pool of information from which to formulate a response. For example, in a simple case, a rule specifying a language condition of only the token "cat" will fire for all questions containing the token "cat". But when a rule specifies a language condition of "<noun.cat.>", it will fire only when a concept annotation is associated with that question. As a result, this second condition will match all (and only) those questions that were annotated with the concept <noun.cat>.

Given any of the conditions, language or business, a rule according to an embodiment of the present invention can be one of several types, example of which follow. One type of rule specifies range operators. Range operators specify the scope, or amount of surrounding text that will be associated with specified expressions of the rule. Examples of ranges include phrase, sentence, and proximity within a specified number of words. For example, consider a literal expression of "cat" which matches any occurrences of the string "cat". A sentence range operator in a rule specifies that the expression or the rule will apply to, or match, any sentence that contains the string cat. The corresponding action of this rule then accesses sentences containing "cat" in content storage 108. A rule including a document range operator therefore specifies that its expression will match documents that contain the string "cat" and its action returns those documents. Other range operators include phrase, proximity, title, subtitle, reference and other range operators that match and retrieve an amount of text, for example, commensurate with the particular range operator.

Another type of rule, in whole or in part, associates data with all or part of the user's question. A question "annotation" refers to the process of associating data with at least a portion of the query, as discussed above. In some cases, the ontology of multi-layered concept repository 134 facilitates the question annotation process. For example, when rules engine 132 detects a specific question pattern (e.g., "how much"), then the concept <how much> in multi-layered concept repository 134 is analyzed to yield a related concept <price>, which is used to acquire the actual price by using semantic index 129. The association between asking "how much" and looking for a <price> can be made via an IML expression in the rules engine. That is, an HAL expression matches variants of the "bow much" intent, and a search component for a concept <price> would be created. Then the concept <price> ran be annotated to the one or more words or token(s) "how much." As another example, consider that part-of-speech annotation refers to attaching a part-of-speech datum (a noun, an adjective, etc.) to some or all words of the question. Annotations on the question can cover the whole question, or any subrange of tokens (i.e., any number of elements) in the question. Returning to the previous example, consider that a question annotation expresses a desired feature (i.e., the price) of the answer. Rule engine 132 could then annotate the question subrange "bow much" with a price requirement in response to the question "how much does a car cost?" This annotation expresses a need for a price (e.g. $20,000) for quick retrieval of such information. The annotation (desired feature) of the answer can often be represented by an EVIL expression, though it can be represented by an expression in any language having a corresponding match to answering content.

A variant of the preceding rule type is one that annotates a bias requirement (i.e., indicator to elevate priority) to a specific answer for a question. Rules engine 132 assigns such a bias requirement based on an analysis of the question type that, for example, requires finding an entire document that is generally relevant to the subject or requires that documents from particular sections of the website or written by a particular author are more valuable than those from other sections of the website. Alternatively, the question type that relates to a recently provided answer can bias the selections of the most appropriate answer. For example, a querier requesting "news about 'x'" values the recency of information. Thus, a rule specifying an expression "news about" would associate data to the query indicating that the most recent information is requested. To identify the topicality of a given document, this type of rule evaluates the time of the query against predetermined time boundaries (as business conditions), and in response, decreases the relevance of any document as the information in a document ages. As described below, response generator 140 uses the bias requirement to then alter the bias by increasing the relevant weight of actions associated with that bias requirement.

Other types of rules can govern how to present a response to a querier, such as by supplying a link to a relevant document in a reserved portion of the user interface of querier 102. Yet another type of rule can define an element as a keyword. When response engine 140 identifies one or more words of the element as keyword, the response engine 140 can invoke a keyword search to acquire a keyword search result, in whole or in part. Keyword search results are general in nature and typically provide a breadth of possible answers that a querier seeks. In sum, rules engine 132 uses these and other rules (and rule types) to generate response criteria with which response engine 140 generates an answer.

Figure 4B:
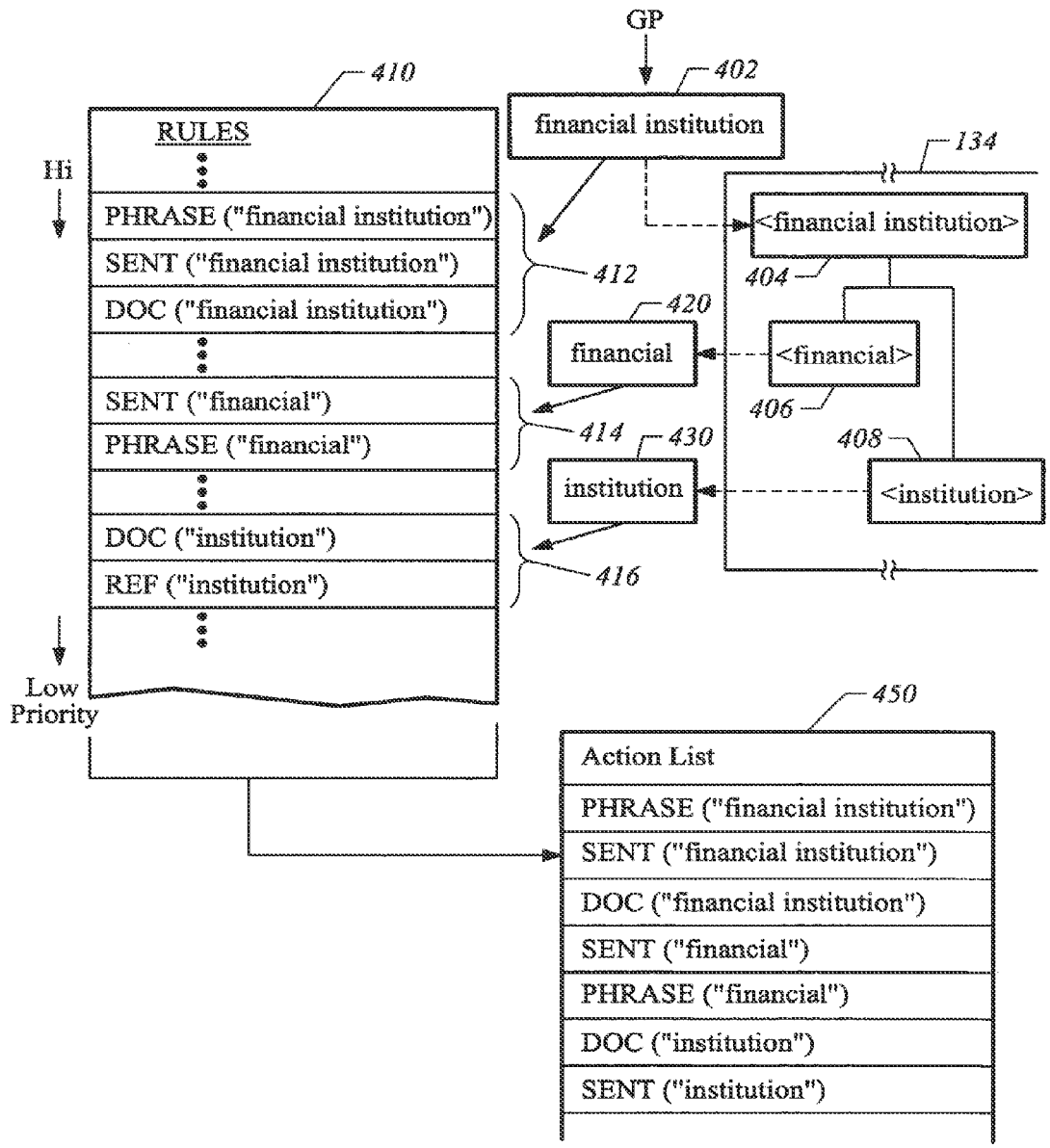
FIG. 4B is a functional block diagram illustrating conceptually how art exemplary rules engine forms search criteria for a portion of a query, according to a specific embodiment of the present invention.

FIG. 4B is a functional block diagram illustrating conceptually how rules engine 132 forms response criteria for a portion of a query, according to a specific embodiment of the present invention. In this example, rules engine 132 receives a question pattern ("financial institution") 402 and annotates this element by cross-referencing it with a corresponding concept ("<financial institution>") 404 stored in multilayered concept repository 134. In this example, the term 'financial institution' has been defined as a compositional phrase composed of two concepts, "<financial>" 406 and "<institution>" 408. Although not shown, concept ("<financial institution>") 404 can match phrases such as "house of finance," "money institution," etc., each of which may or may not be specified as a language condition of a rule in rules dictionary 133. After this version of the question annotation process has completed, the terms ("financial") 420 and ("institution") 430 can be associated as data with question pattern 402.

Question pattern ("financial institution") 402 and the terms ("financial") 420 and ("institution") 430 are referred to as "search components." A search component includes a type of question annotation that expresses desired search criteria for a portion (i.e., one or more elements), or range, of a user request. For example, the words "mutual fund" from the query "which mutual funds are good for retirees?" constitute a search component). Note that the breadth of a search component range can be as small as a single word, or can contain multiple words and phrases that occur within some specified proximity, which can be defined by an IML expression. According to the present invention, search components are one of the methods of specifying information retrieval for both structured and unstructured data. As such, a search component can define a set of search criteria consisting of one or more IML or other expressions, such as an SQL expression.

As shown in FIG. 4B, question pattern 402 as a search component ("financial institution") defines search criteria 412, which includes actions in rules 410 that are enabled by the presence of question pattern 402 as a true condition. The expressions specified in PHRASE("financial institution") will return all phrases containing the expression financial institution. Next, expressions specified in rules SENT("financial institution") and DOC("financial institution") will return those sentences and documents that respectively contain that expression. Similarly, search component 420 "financial" defines search criteria 414 that specifies actions defined by rules SENT("financial") and PHRASE("financial"). And search component 430 "institution" defines search criteria 416 that specifies actions defined by rules DOC("institution") and REF("institution"), which return those documents and HTML links that respectively contain (or refer to) that expression. Note that the one or more search component expressions have been arranged in order of priority, or desirability of the results. That is, the topmost search component of rules 410 relates to higher priority search criteria 412. Each subsequent search component expression in the list is assigned a lower quality score. As such, search criteria 416 has a lower score than that of search criteria 414. Rules engine 133 then places search criteria 412, 414 and 416 into action list 450, which will be provided to response engine 140. As will be discussed later, the scope-scoring mechanism of system 100 of a specific embodiment then can find as many unique search component matches as possible. If multiple search criteria from the same search component are found to match, then the scope-scoring can add the score of the highest-priority criterion to which it matches. For example, the phrase "financial institution" will match PHRASE("financial institution"), and also DOC("institution"). The scoring will take into account the higher priority match ("financial institution"), but not the lower-priority one ("institution"). This practice of accounting for a single 'unique' search component match can avoid 'double-counting' different search criteria within the same search component.

In some embodiments, the range associated with a search component can contain or overlap ranges associated with other search components. In such a case, rules engine 132 can subsume other search components that are fully contained within its range. As an example, consider three search components: "stock," "options," and "stock options." So long as the ranges of both "stock" and "options" fall within the range specified by "stock options," the latter search component can be configured to subsume the former two and take precedence. Similarly, a search component can be configured such that if another search component already exists over the applicable range, only the search component which initially existed on that range will be used. In another search component configuration of a specific embodiment, both search components can be used.

Figure 4C:
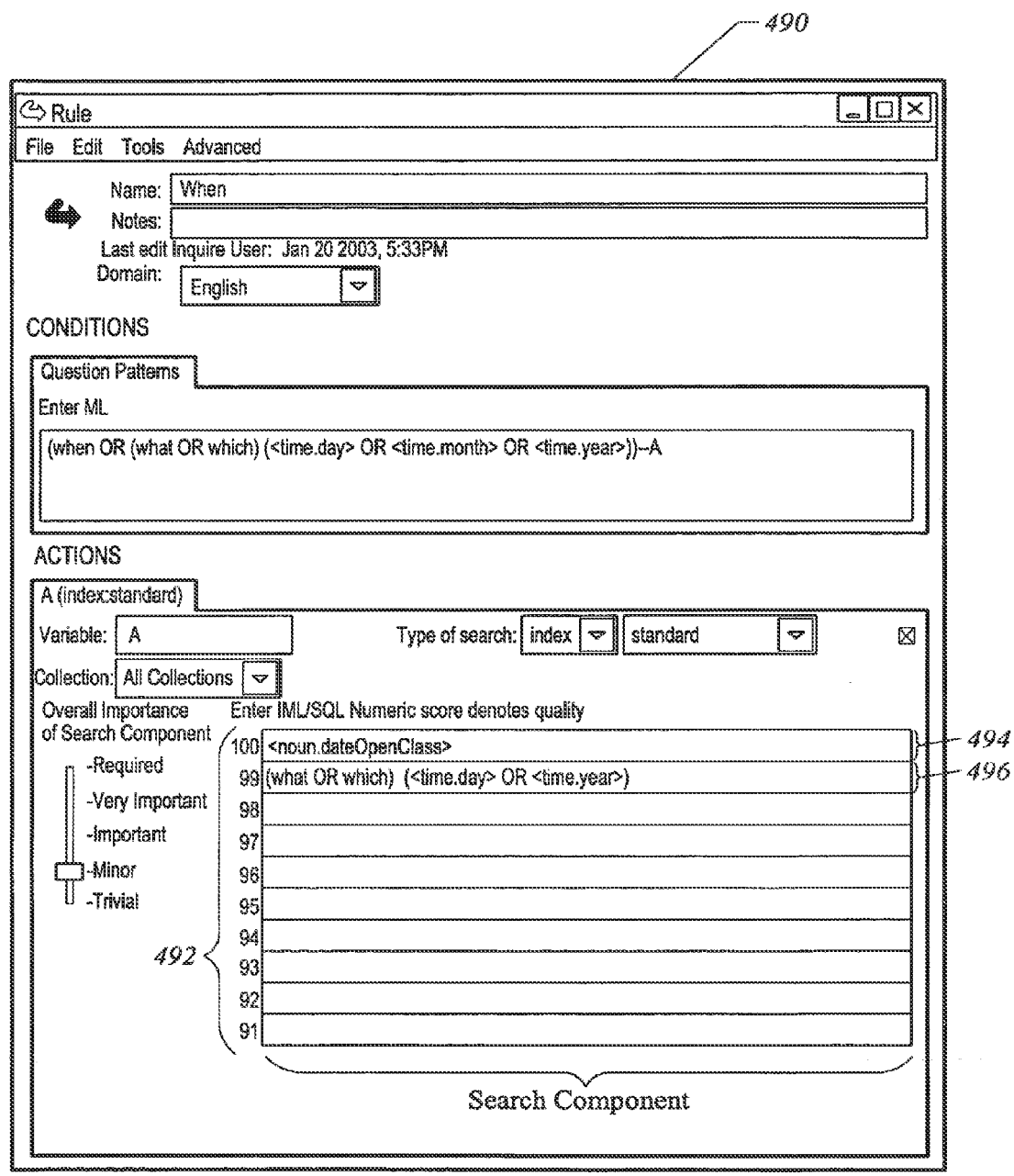
FIG. 4C illustrates a screenshot exemplifying a search component composed of search criteria, according to an embodiment of the present invention.

FIG. 4C illustrates an example of a search component composed of search criteria, according to one embodiment of the present invention. As shown in screenshot 490, a search component 492 is defined. As shown, search component 492 is composed of search criterion 494 ("<noun.dateOpenClass>") and search criterion 496 ("(what or which)(<time.day> OR <time.month> OR <time.year>"). In this case, an IML rule will match questions that are asking when a particular event occurs. Admin 106 can add a rule to include search component 492, which prefers to first search criterion 494 seeking <noun.dateOpenClass> matches, such as "Jan. 3, 1986," But failing to find that kind of match, the next search criterion 496 will match <time.day>, <time.year> and other potential answers to the "when" element of a question.

Based on the list of actions, response engine 140 selects one or more information retrieval technologies that best services the query. When selecting the retrieval technologies (or combination thereof), response engine 140 may choose to utilize an ontology to find specific answers to questions, or it may choose to find documents with the highest general relevance to the user query. Since system 100 uses a question-matching language, such as IML, rules engine 132 can match anything from very specific questions to very general classes of question. As an example, the question-matching language should be able to recognize questions that begin with "what kind of (noun phrase)," "which (noun phrase)," but not "is (noun phrase) (attribute)" because the subject to which it is being equated is indefinite. With this language, response engine 140 should be able to distinguish a short query composed of a small number of query words (which may be sufficiently answered with information resulting from a keyword search), rather than from a longer, more syntactically complex query (which may require the use of an ontology for resolving the question).

The multi-layered concept repository 134 can be referred to by System 100 in defining both the conditions and actions of rules. For example, a rule condition could refer all "children" of <noun.animal>. Such a condition would match any question which was annotated with a concept with a "type of" linkage to the concept <noun.animal>, such as <noun.animal.cat>, <noun.animal.lemur>, etc. A rule may refer to the immediate children of a concept, to all descendents (children of children, recursively), to parts-of a concept, or to any graph traversal definable for the multi-layered concept repository. In a preferred embodiment, a set of common traversals are defined, including "children(<concept>), descendants(<concept>), etc.

The multi-layered concept repository may also be referred to in defining search components for specific types of question. For example, consider the two example questions in Table 1, below. The first question is appropriately answered with a listing of types of sedans which have front wheel drive. The second question is appropriately answered by the statement that the Accord Sedan has front-wheel drive, or the statement that the Accord Sedan has rear-wheel drive, or some other statement defining the type of drive the Accord Sedan. Note that the first question is not answered by the statement that "Some sedans have rear-wheel drive", and the second question is only partially answered by the statement that "The Accord Sedan LX has front wheel drive", where the Accord Sedan LX is a specific type of Accord Sedan. To appropriately answer both of these questions. System 100 recognizes the two questions as distinct question patterns, and employs differing traversals of the multi-layered concept repository to define search components for the two questions.

A particular embodiment of System 100 will respond to the two previous example questions as follows: question 1 will match the language pattern "which <noun.automobile> has <noun.automobile.part>". Having matched this pattern, it will add a search component over the range of the user's question correspond to the <noun.automobile> portion of the language pattern. The search criteria of this search component will be the children of the particular automobile in the user's query which matches that question range. Additionally, this rule will add another search component over the range of <noun.automobile.part> whose search component will be the specific car concept annotated to that portion of the user's query. As a result of these two search components, the system will return as responses to the initial question: types of sedan (as linked to the concept <sedan> in the multi-layered concept repository) which have front-wheel drive (or terms synonymous with front-wheel drive, as defined in the concept repository). Because the system identified the question type with the appropriate question pattern, it was able to define search components which correctly reflect the desired elements of the answer.

The second example question employs a separate usage of the multilayered concept repository in order to define different search components from the tint question. Again, the difference in response is triggered by the match of a different language pattern. In one embodiment, the second example question will match a rule with the language pattern condition "does noun.automobile> have <noun.automobile.part>". This matching rule will then define two search components. One, associated with the <noun.automobile> range of the user's question, will attempt to match the specific type of automobile referred to in the user's question. The second search component, associated with <noun.automobile.part> will attempt to match either the specific car part referred to in the user's question, or an equivalent replacement car part, as recorded in the multilayered concept repository. As a result, the system will find as responses to this second question occurrences of the specific type of car referred to by the user in the question (the Accord Sedan), in association with front-wheel drive, near-wheel drive, or some other equivalent car part, as encoded within the concept repository.

Because response engine 140 can react dynamically to employ the appropriate retrieval technology for a suitable type of question, it has the flexibility to avoid the problems normally associated with information retrieval techniques based on either document-level relevance or ontology-based retrieval, the benefits of which are exemplified in Table I.

accumulated relevance determinator 503 and link analysis module 505, relative weight assignor 504, scope-based scorer 508 and recency module 509.

Accumulated relevance determinator 503 is configured to effectuate a degree of document-level relevance based on occurrences of the combination of tokens, stems, and concepts. That is, the document-level relevance depends on the relevancy of each term (i.e., token), stem and concepts, as is described in Equation 2. Upon detecting an action associated with query elements that include one or more concepts, accumulated relevance determinator 503 can determine, and assign, a relevancy score to that action. Response engine 140 uses the relevancy score to govern whether the action will be performed. Normally, a standard metric known as term frequency-inverse document frequency ("TFIDF") is used for judging the relevance of a document (on the whole) to a query. According to a specific embodiment of the present invention, accumulated relevance determinator 503 determines the relevance for a document of a query based on a variant of the TFIDF metric. Concept-based relevance of a document can be expressed in Equation 1 as follows:

$$\text{Concept-based relevancy}(c,d) = \text{ConceptFrequency}(c,d) \div \text{DocumentFrequency}(c), \quad \text{Equation 1}$$

where ConceptFrequency(c, d) is the number of times concept "c" occurs in a document "d," and DocumentFrequency (c) is the number of documents that include one or more occurrences of concept "c."

TABLE I

1. Syntactic and lexical information associated with concepts help resolve the inaccuracy of ontology-based traversals that otherwise would be encountered. By establishing multi-layered concepts (and relationships therewith), response engine 140 can adapt its functionality using multi-layered concept repository 134 based on results of the linguistic analysis performed by rules engine 132.
Examples:
(1) the question: "'Which sedan has front-wheel drive?" invokes system 100 to match types of sedans that have front-wheel drive, as defined by interrelated concepts; and
(2) the question: "Does the Accord Sedan have front-wheel drive?" invokes system 100 to find any number of variations of Accord Sedan that collectively may have front-wheel, rear-wheel and four-wheel types of drive.
2. By analyzing a query in view of the actions listed by rule engine 132, response engine 140 can be configured to respond to simple queries using keyword searches and/or document-level relevance. Or, it can also be configured to use ontologies in response to more complicated questions requiring more specificity.
Examples:
(1) the question: "mutual funds" will be identified by system 100 (e.g., rules engine 132) as a question requiring a general, high-quality document match. Response engine 140 can use document-level relevance to find the document that is highest-quality in terms of being the most relevant to mutual funds; and
(2) the question: "is there a no-load mutual fund with a 5-star rating?" will be identified by response engine 140 as a question that seeks a specific answer, based upon at least one action list generated by rules engine 132. System 100 will find this answer, even if the information is not on a page that is generally about mutual funds.

Figure 5:
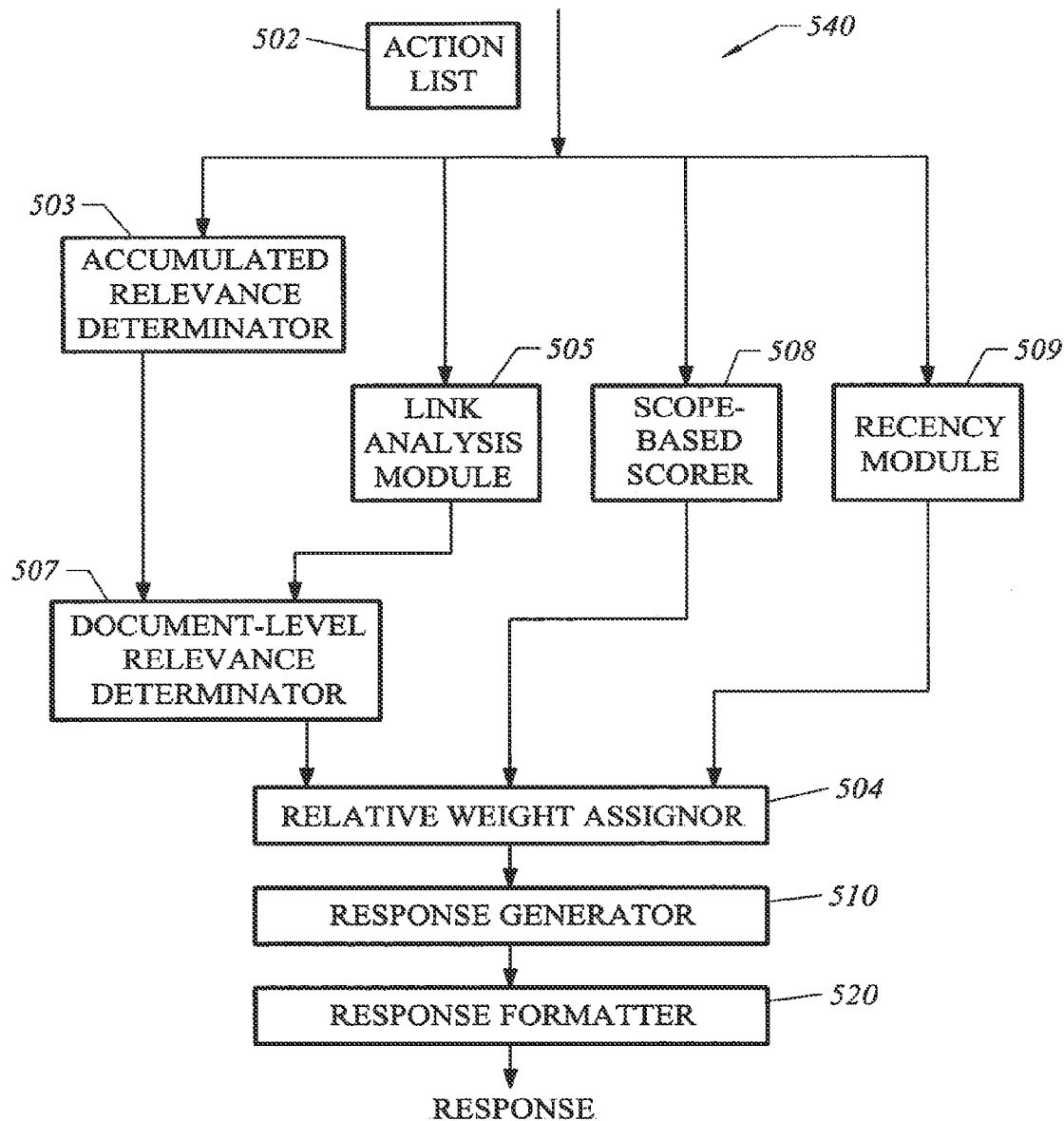
FIG. 5 is an exemplary response engine in accordance with one embodiment of the present invention.

FIG. 5 is an exemplary response engine 540 in accordance with one embodiment of the present invention. Response engine 540 implements one or more information retrieval technologies, individually or in combination (e.g., in varying degrees), in accordance to the search criteria generated by rules engine 132. Based upon the search criteria included in action list 502, in whole or in part, response engine 540 selects a specific one or more retrieval mechanisms or techniques that can be characterized as variants of keyword searching, document-level relevance-based searching, and ontology-based searching, but may include any other type of information retrieval technology. Response engine 540 implements these technologies using document-level relevance determinator 507, which operates on the outputs of Accumulated relevancy is determined in conjunction with the TFIDF standard term-based relevance, as well as a TFIDF stem-based relevancy (using the occurrence of a stem rather than a concept or term) and a TFIDF concept-based relevancy. That is accumulated relevance determinator 503 defines accumulated relevancy at least in terms of tokens, stems, and concepts and determines an accumulated relevancy score for a particular document (for a given word) as a weighted average of the concept-based relevancy scores for (1) that word as a token, (2) that word as a stem, and (2) for those concepts in which that word appears. The accumulated relevancy score assigned to a particular document therefore can be expressed with Equation 2 as follows:

accumulated relevancy score=[($c1$*term-based relevancy)+($c2$*stem-based relevancy)+ ($c3$*Concept-based relevancy)]÷($c1+c2+c3$)  Equation 2 where term-based relevancy is the TFIDF standard, and concept-based relevancy and stem-based relevancy are determined as described in Equation 1 where "stem" and "concept" respectively, describe occurrences of stems and concepts. Constants c1, c2, and c3 define the relative importance assigned to term-based, stem-based, and concept-based relevancy, respectively, and can be configured by admin 106, or can be determined automatically by system 100. In some embodiments, elements other that those defined as tokens, stems, or concepts can be used to determine an accumulated relevancy score for a document. Moreover, other scoring formulae which can be implemented for determining the accumulated relevancy score are within the spirit and the scope of the present invention. Further, document "d" can be substituted by titles, sections, etc, to determine concept-based relevancy with respect to sources of answers other than documents.

Link analysis module 505 optionally provides a contribution of a particular document's relevancy, so long as that document is an electronic document, such as a web page. In a specific embodiment, link analysis module 505 derives a measure of relevancy of an electronic document based upon the number of other electronic documents (e.g., web pages) that point to that electronic document.

Document-level relevance determinator 507 generates a measure of relevancy of a particular document to one or more queries, according to an embodiment of the present invention. An exemplary document relevancy score determined by document-level relevance determinator 50 is a weighted combination of the results of accumulated relevance determinator 503 and link analysis module 505. In one embodiment, the result of accumulated relevance determinator 503 is multiplied by a factor of 0.4, the product of which is added to the result of link analysis module 505 multiplied by a factor of 0.6. Note that these weightings (e.g., 0.6 and 0.4) and other weightings described herein can be provided to response engine 540 via action list 502. In particular, one or more rules of rules engine 132 can determine the weightings with which to determine the response by response engine 540.

Recency module 509 provides a contribution of a particular document's relevancy, especially with respect to the recency of the information contained in that particular document. In one embodiment, the "file last modified date" can be used to determine recency, among other known techniques. Concept-based rules that match query elements "news about iraq," for example, can also determine whether the recency of information is more important to consider. In particular, "news about iraq" requires information that tends to have a value that decreases with time, so it is imperative to seek this information when answering a question regarding the news.

Scope-based scorer 508 evaluates one or more of the actions 502 as potential answers to the query, where the potential answers can be sentences, paragraphs, sections, entire documents, or the like, with each of these potential answers having an attendant "scope." A scope is a size, classification applied to a unique portion of content. Note that some potential answers can have variable scope, such as variable size of a section. That is, a section can be composed of a paragraph (i.e., having the length of a paragraph) or a chapter length having the length of a chapter). Scope-based scorer 508 assigns a score to each scope that is representative of the ability of the scope to answer the query.

Scope-based scorer 508 initially assigns scores to each scope based on the number of unique search component matches made within that scope. For example, a sentence scope that contained matches for each search component annotated on the question is typically assigned a higher score than another sentence that contains only some of the matches. An initial score for a scope "s" is expressed in Equation 3 as follows:

Scope(initial)=(sum of search component scores matched in "$s$")÷(maximum possible sum of search component scores that could match in "$s$"),  Equation 3

Note that a search component typically has multiple search criteria, any of which might or might not have a match within a scope. Of those search criteria from a particular search component that have a match within a scope, only the highest scoring will be used in determining that search component's score. Specifically, the score of search component "ac" within scope "s" is the score of the highest-scoring search criterion contained within "sc" which has a match within scope "s". The numerator of Equation 3 refers to the sum of all search component scores for a given scope "s". The denominator of Equation 3 reflects the theoretical sum of search component scores, if every search component were to have a match at its highest-scoring search criterion. Because it is typically not the case that every annotated search component matches at the level of its highest-scoring search criterion within a particular scope, the initial scope score is usually less than 1. The initial scope score will by definition be always be greater than or equal to zero, and less than or equal to 1.

After scope-based scorer 508 calculates the initial scope scores, each scope (initial) score is normalized based on its scope type. For example, the initial scope score can be multiplied by a constant associated with its scope type. To illustrate, consider that the scope constant for a sentence is higher than the scope constant for a document. As a result, a sentence matching all of the search components will generally score higher than a document matching all of the search components. Generally, the higher the normalized score is, the more apt the attending possible answer is at answering the query. With this measure, response engine 540 selects the most appropriate answers given that the user interface of querier 102 has limited display area on which to present the particular response. Although scope-based scorer 508 is shown in FIG. 5 as functioning in parallel to relative weight assignor 504 and concept-based relevance determinator 506, scope-based scorer 508 can function in serial to the functionality of either both of the other two or only one of the other two.

Note that the functionality of document-level relevance determinator 507, scope-based scorer 508 and recency module 509 are merely representative of the possible techniques for determining relevancy of content to a particular query. In other embodiments, other scorers can generate measures of relevancies of content to a query based on whether the question is technical, whether a document was authored by a revered person, and any other type of relevancy measure.

Relative weight assignor 504 is configured to effectuate a degree of various searching techniques when the query is of general nature. As such, it generates a result based on weightings of the results of document-level relevance determinator 507, scope-based scorer 508 and recency module 509. That is, for certain types of questions, a more exact answer is preferred. Thus, the scope-based scorer's results can be most favored. But for some types of questions, a high quality document as a solution is preferred. Thus, document-level relevance can be more preferable. Further, other types of questions require solutions that have most recent information. So, depending on the question for which an answer is sought, a set of corresponding weights as defined by rules dictionary 133 can be assigned.

First, relative weight assignor 504 determines whether a specific question type, as defined by a rule in rules dictionary 133 (i.e., includes a bias requirement), requires biasing the answer toward either a specific response, or an entire document that is generally relevant to the subject, or the most recent possible answer. As an example of biasing toward the most recent answer, again consider the question "news about Iraq." So, the results generated from recency module 509 may be given a higher weight than results from document-level relevance 507 and scope-based scorer 508. Since news includes time sensitive information, the value of which decreases over time, relative weight assignor 504 assigns a higher weighting than otherwise would be assigned to those documents containing relevant time-sensitive information. Examples of biasing toward (1) both an entire document that is generally relevant, and (2) a specific response, a simple keyword query "stocks" will be biased to find pages that are generally about stocks (i.e., by weighting results of document-level relevance determinator 507 more heavily than the others), whereas question "what is the current price of Company X" should be biased to find, a specific number (i.e., by weighting results of scope-scorer 508 more heavily than the others). In operation, relative weight assignor 504 evaluates actions specified in action list 502, one or more of which reflect the nature of the query (e.g., specific, general, time-sensitive, etc.) and then correspondingly assigns an increased weighting to those actions. Those increased weightings therefore can introduce a keyword-like search criterion that response engine 140 considers when generating a response. So, if response engine 140 detects an action based on rule DOC ("stocks") (e.g., return a document matching the search component 'stocks' for providing general stock information), for example, then that action will be assigned an increased weight than it otherwise would.

An example of an implementation of a regular expression language (e.g., IML) that can affect the result of relative weight assignor 504 is as follows. Consider a case in which a question seeks topical or time-sensitive information to provide an answer to querier 102. In this case, relative weight assignor 504 will apply a relatively heavier weight to the recency of answers (i.e., the results of recency module 505). The following simplified rule will have this effect:

Rule Condition: (an IML expression): <noun.topic.news> OR "recent" OR "latest"

Rule Action: set relative weights as follows: (i) overall document relevance: 20%, or 0.2, (ii) exact answer match (e.g., using scope scorer): 20%, or 0.2, and (iii) recency of document: 60%, or 0.6.

When the rule's condition matches any question which includes either the concept "noun.topic.news>," or the tokens "recent" or "latest," the action will cause system 100 to value the recency of a document higher than other measures (e.g., such as being assigned a 0.6 weighting) in evaluating the overall score of a response.

After relative weight assignor 504 completes its task of generating a weighted result, response generator 510 uses its output in whole or in part to generate one or more answers. Response generator 510 uses the relative weights as form of normalized score to identify the sources of content that will be accessed to provide answers to the query. As such, response generator 510 governs access by response engine 540 to content storage 108 via semantic index 129. For example, if action SENT("financial") of action list 450 of FIG. 5 has been assigned a relatively high score, then when response engine 540 performs that action, the sentence containing the term "financial" will be retrieved. In some embodiments, business rules may affect the ranking of answers sometimes overriding highly weighted scores of actions based on language rules) to reprioritize the content to be presented. For example, a business rule condition may be used to detect a specific user and that user's financial account information.

Response generator 510, in turn, can display financial characteristics of the user's account, such as a retirement calculator based on current account levels. Once response generator 510 retrieves the information based on executing actions, response formatter 502 formats the answers for display on appropriate display technologies. If the response is to produce one or multiple display portions of the user interface, response formatter 520 operates to format the responses to appear in different sections of the user's response screen.

Response formatter 520 supports displays of many types of responses, not just answers. Other types of responses include selected category links to major sections of the site related to the question, featured content in the topic area of the question, suggested actions for the user to take, etc. Response formatter 520 is configured to generate formatted responses as a dynamic navigation user interface ("DNUT"), which organizes the different types of responses into components for easy visual recognition and consideration by the user. These components are each referred to as a "portlet," which is a qualitatively distinct portion (e.g., of a user interface, such as a display) for one of multiple responses given to the user in response to a question. While one portlet can include exact answers to a user's question, another portlet can contain links to high-quality content related to the same or different aspects of the subject of the question. Each portlet is customizable using, for example, Cascading Style Sheets (CSS), XSL, etc.

Response formatter 520 can generate a DNUI to include various portlets that each display different types of results. Typically, this means that the results of different types are sent to different frames within, for example, a single web page of search results. These portlets enable queriers to received consistent, focused, and targeted presentation for various types of application content, such as unstructured text, online glossaries, and promotional material. In some embodiments, response formatter 520 uses XML tags within the content to identify which portions of the content are appropriate for a particular portlet. An exemplary DNUI is generated by response formatter 520 to include portlets for presenting: (1) detailed, exact answers, (2) additional useful information, suggested by the nature of the question, (3) action items, based on the nature of the question, that the user might want to pursue to purchase products or services immediately, (4) guided browsing opportunities, via a list of related links, (5) a window to converse or chat (via text) with a customer representative, (6) another "Ask A Question" box for additional questions, (7) video display and other like functions to facilitate a response.

FIG. 6 illustrates an exemplary dynamic navigation user interface ("DNUI"), according to an embodiment of the present invention. Consider that user interface 600 can provide responses to short keyword queries (e.g., "IRA") and to unspecific natural language questions, such as "Tell me about IRAs." In responding to the former, the most relevant and important pages and/or documents among all the pages or documents that address the broad query topic, are returned based on, for example, the respective weights and scores from relative weight assignor 504 or concept-based relevance determinator 506. From these weights and scores, response formatter 520 formats the displayed responses in relation to the sources prominence of the page on a site (i.e., performing "link analysis"), content within the page or document (overall relevance of the content to the topic), and recency of the update to a page or document containing an answer. But in the example depicted in FIG. 6, system 100 considers the overall page and for document relevance, although less importantly, when searching for more specific answers, such as the query: "How much can I contribute to an IRA?" as shown in portlet 602. As such user interface depicts the responses typical for a more specific query.

As shown, portlets 604 to 614 present responses to the querier. Based on language and business rules, as well as its score, the information associated with portlet 604 has been determined to be a so-called "perfect answer," Portlet 604 displays content that aptly provides an answer to a querier in an easy-to-understand, tabular format. Portlets 608 and 610 offer the querier alternate sources of information to find additional information, if so desired. Portlet 614 presents the user with another opportunity to either refine its query or start a new search. Portlet 612 presents the user with additional information supplementing the answer provided in portlet 604. Lastly, portlet 606 offers specific actions that the user can undertake, allowing the owner of the content to cross-sell products as well as satisfying their customers' needs.

In some embodiments, portlet 610 is established by "excerpting," which refers to the portion of the user interface that displays textual snippets ("excerpts") to the user. Excerpts are drawn from content that has typically been obtained through content acquisition and indexing. But this and other portlets can be formed with "scope-based excerpting." Response formatter 520 employs scope-based excerpting to create excerpts dynamically by applying various algorithms to the highest scoring scopes, thereby compiling and formatting relevant body and heading text for presentation in a portlet of the user interface. In particular, scope-based excerpting generates variable excerpts that vary its window size depending on the scope type (e.g., sentence, section, document, etc.) on which they are based. For example, if the scope is a sentence, then a different algorithm is used to create the excerpt than if the scope is a document, and the sentence can be displayed in a reduced-sized portlet.

In some embodiments, portlet creation is flexible. That is, based on an analysis of the question, system 100 chooses which portlets are appropriate for that question. These portlets are then instantiated and displayed as elements of the overall response given to the user. In various embodiments, the portlet instantiation is automatic. This means that a rule may specify exactly the amount of content to display for a particular portlet (e.g., to create a smaller-sized portlet). Alternately, system 100 may use XML tags within the content to identify which portions of the content are appropriate for a particular portlet. In some cases, the system will intelligently choose, based on question type and content type or some other measure, whether to present the user with excerpted content as it appears in the original form (with bolded text, italics, other formatting preserved) or whether to normalize the content excerpt into a standard form. In other cases, excerpts are highlighted based on the excerpt's scope type as well as the search component matches that are matched within that scope. Multiple levels of highlighting may be used to indicate the type of scope and the portions of the text that match a particular search component.

Referring back to FIG. 1A, system 100 employs anaphora resolution in query processing according to another embodiment of the present invention. As such, anaphora resolution (and co-reference resolution for noun phrases) link referring expressions such as "the car" or "this car" with the object to which is being referred, such as "Honda CAR X." Referring expressions are resolved using a partially ordered list of entities (a "salience list") from the previous question. Ontology and search component scores for the previous question's concepts are used to order the salience list members. Ontology scores are scores associated with particular concepts. Usually, such scores are associated with the layer of the ontology which the concept appears in, with the higher, more organizational-specific (e.g., customer-related) concepts appeared higher scores. The final match in a salience list is determined when response engine 140 applies syntactic and semantic constraints from the referring expression to the top salience list members. Semantic constraints include using ontology concept relations to determine a direct relationship. For example, the referring expression "the car" provides a semantic constraint on the salience list members of requiring the member to be a type of car, which can be checked via the ontology. The matched salience list member, a concept, is then linked with the referring expression and used for matching during answer searching.

Figure 7:
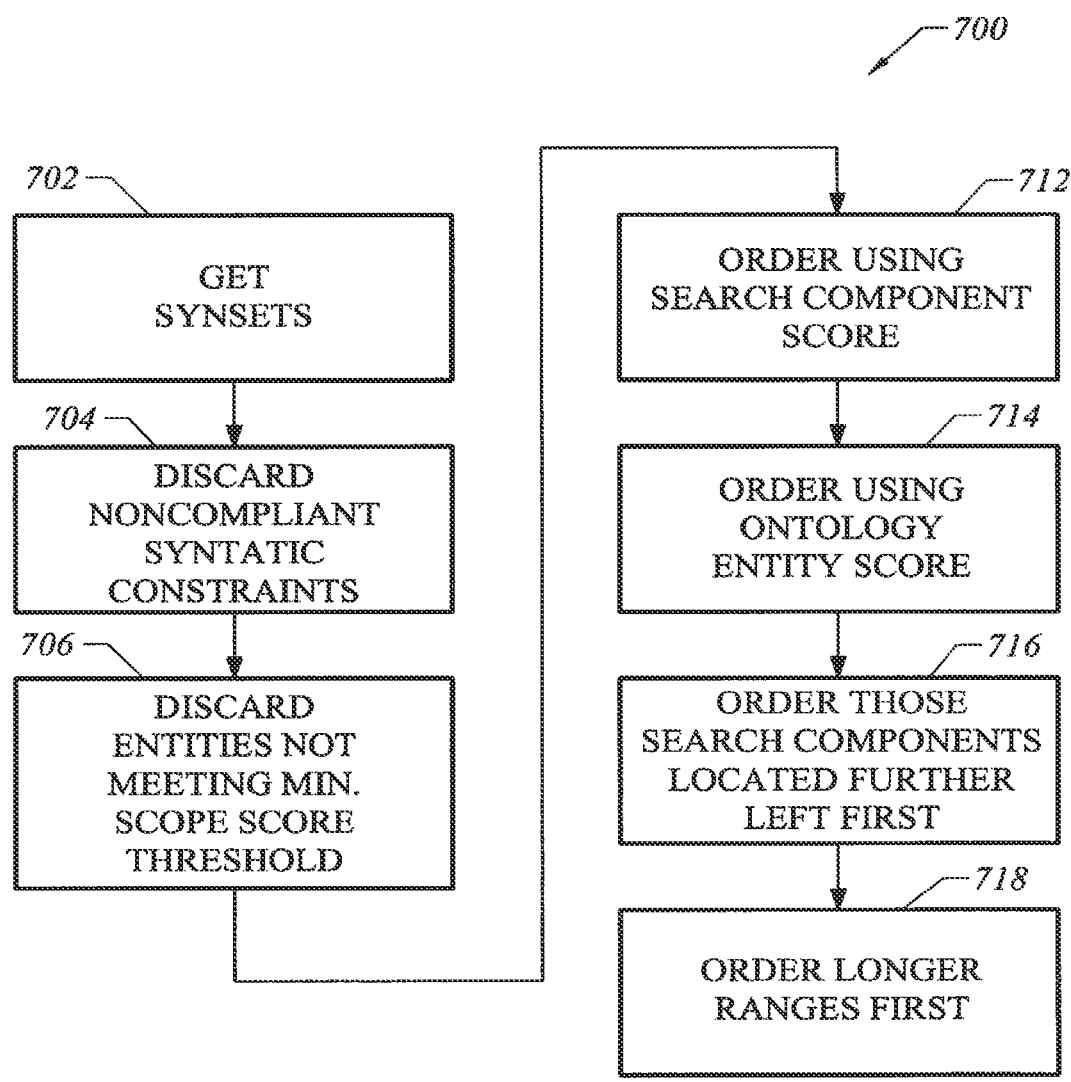
FIG. 7 depicts an exemplary flow diagram for a method of forming a salience list, according to a specific embodiment of the present invention.

FIG. 7 depicts an exemplary flow diagram 700 for a method of forming a salience list according to a specific embodiment of the present invention. At 702 synsets from the question (where a synset is a set of terms that denotes a similar concept) are retrieved. At 704, system 100 discards entities not meeting, or noncompliant with, syntactic constraints, such as "the entity is a noun phrase," "the entity is not a pronoun," etc. Then at 706, system 100 discards entities not relevant to the content domain or topic by requiring the ontology score to meet a threshold. Next, at 712, the salience list is partially ordered using search component scores. At 714, ontology entity scores are used to further order the salience list. Flow 700 continues to 716 and 718 where the salience list is ordered using synsets (in the salience list) located furthest left first (moving to the right) and synsets having longer ranges first (followed by smaller ranges), respectively. To create a salience list, system 100 filters and partially orders a refined set of synsets from a current question, where flow 700 focuses on the high-layer and mid-layer (e.g., customer and industry entities) to be used as candidates for reference resolution in the next question, where the notions of high-layer and mid-layer are discussed in connection with FIG. 2.

As an example, consider first that a regular expression language, such as IML, is used to determine if there are any referring expressions. These expressions form a configurable set of base expressions generated by picking out "it," "this," "that," "these," "those," "the X," and "this/that/those/ these X," for example. The expressions also help skip existential terms, such as "it" and "this," which are not referring to specific entities in the discussion universe. Second, for each referring expression found, flow 700 uses the salience list starting with the first entity to resolve the referring expression. Next, for anaphora (e.g., "it") and deistic (e.g., "this," or "that"), flow 700 checks to see if the expression can be resolved within the sentence. Note that a salience list can be created from a current sentence, and that System 100 may try to apply to the referent expression the entities located prior to the sentence containing the referring expression. If indeed the anaphoric term resolves within the sentence, then no additional resolution is performed. For example, consider: "In the 2003 Accord DX, does it come with ABS." Here, the "it" will not be resolved. Otherwise, it checks for synset subsumption (rigid phrases subsume one another and the same synset shouldn't overlap or annotate within the range of itself), and annotates the referent synset on the range of the referring expression's head phrase.

According to a specific embodiment of the present invention, flow 700 described in FIG. 7 describes the creation of an exemplary salience list. This salience list then can be used to resolve concept anaphora to which it is referring. Another flow can be used in addition to flow 700 to resolve the task. This alternative flow is described as follows: First, the salience list is retrieved for the previous question. Then, a referring expression in the current sentence is identified as a target for creating another salience list for the current sentence. Next, the exemplary system determines if reference resolves within the sentence. If not, then it reviews the top member of the salience list and applies semantic constraints. Then the system annotates the sentence for anaphoric resolution.

Lastly, for referring noun phrases ("the car," "this car"), the system first checks if the phrase resolves within the current sentence as described in the previous step. If it does not resolve within the synset, then it checks semantic constraints using the ontology traversals. The head of the referring expression should be related to the referent in one of two ways: hypon, partn→hypon. Ex: "the car"—hypon-->"Accord DX", "the wheel"—partn-->[car]—hypon-->"Accord DX." if either relation holds, and there are no subsumption conflicts, then the referent synset is annotated on the range of the referring expression's head phrase. Interestingly, ontology relations are used to apply semantic constraints on the resolution. Further, the use of NIL, if used, avoids the existential "it/this" problem.

Figure 8:
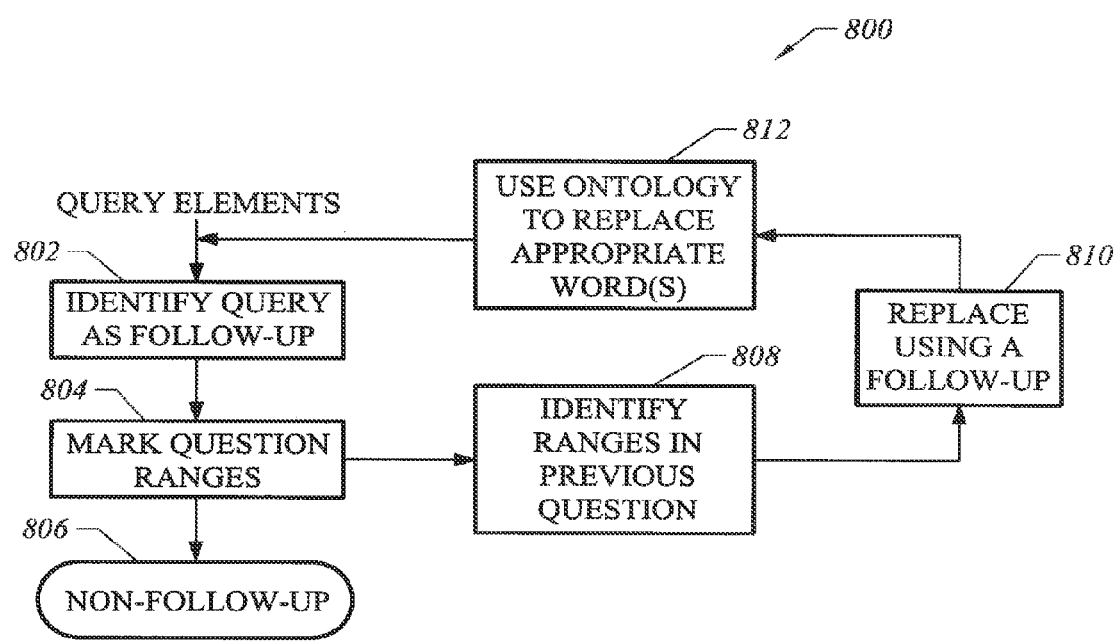
FIG. 8 depicts an exemplary flow diagram for a method of forming a follow-up question based on a previous question, according to a specific embodiment of the present invention.

FIG. 8 illustrates an exemplary flow 800 for generating follow-up questions to previous question, according to one embodiment of the present invention. In particular, a question asked by a user of system 100 can be classified as a "follow-up question," and responded to appropriately. For example, a user might ask, "what minivans are available in red?" and then "what about blue?" The second question is the follow-up question; its response should take into account that this question is about minivans, but that that the response to the second question should use "blue" in place of "red" in generating a list of minivans to deliver as a response.

To respond appropriately to a follow-up question, system 100 must first identify which questions are follow-ups, and which are independent. In one embodiment, this is done within rules engine 132, by the recognition of certain expressions identifying a follow-up query intent ("what about x", "y instead", and the like) at 802. Additionally, the actions of rules engine 132 will mark (i.e., annotate) those portions of a question at 804 that will be used to replace portions of the previous question. In the example given above, the portion of the question corresponding to "blue" will be marked as an appropriate replacement in the context of the previous question. In the preferred embodiment, a language such as IML will be used both to identify a question as a follow-up, and to identify which portion of the question is appropriate for use within the previous question at 808. Additionally, the actions of a rule will record whether the marked portions of a follow-up question are appropriate for replacing a portion of the previous question at 810, whether they should supplement the previous question, or whether a portion of the previous question should be subtracted.

When a question is identified as a follow-up in this embodiment, a follow-up module (not shown) is called in response to the action of a rule. This follow-up module must decide which annotation within the previous question should be replaced with the marked portions of the current, follow-up question. In one embodiment, an ontology is used at 812 to identify those concepts in the current and previous questions which share a common ancestor. That concept contained within the previous question is then replaced, supplemented, or subtracted (as appropriate) by its "cousin" within the follow-up question.

Having made the appropriate annotation changes in the previous question to reflect the follow-up intent, the previous question is then resubmitted to the rules engine in its modified form. Because of the changes made, the response delivered to the user will be appropriate for the user's follow-up question, in the context of the relevant question previously submitted by the user.

The various methods of generating one or more responses to a query, as described above, can be governed by software processes, and thereby can be implemented as part of an algorithm controlling the generation of responses based on one or more queries. Examples of such algorithms include: forming and using multi-layered content repositories, building semantic indexes, employing business and language rules in forming actions that define responses, scoring those actions, generating a dynamic navigation user interface, etc.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

APPENDIX I

InQuira Match Language ("IML")

The InQuira Match Language (IML) is a language for specifying conditions and actions based on matching words, phrases, and concepts in user requests and application content. It is intended be used as a means of matching natural language sentences, whether user questions or sentences within indexed content. During exemplary request processing, a rules engine can process IML within rule components, which specify conditions. Then, the rules engine can process IML expressions that specify actions for rules containing true conditions for the request being processed. IML is a regular expression language, comprising a set of symbols that define various functions and operations. These symbols are specified in combination with words of interest to form IML expressions.

Arguments for expressions are delimited by parentheses, and separated by commas. A programmer can create nested expressions using parentheses to delimit the enclosed expressions.

The IML Elements are:

- Basic Expressions
- Operators
- Keywords
- Macros
- Number Expressions
- Variables

I. Basic Expressions

Basic IML expressions are the means of specifying semantic matching for words and phrases in user requests and in indexed content, such as that stored in a Semantic Index. Basic expressions generally resolve to single units of meaning within user requests or indexed content. Within indexed content, single units of meaning occupy a designated position, and are referred to as "offsets." The various types of base expressions enable one to match words and phrases as literal character strings, canonical forms that include variations in wordform and punctuation, and concepts that include semantic relations as defined in an ontology.

The following basic expressions are valid in IML:

- Literal Expressions
- Canonical Form Expressions
- Concept Expressions.

A. Literal Expressions

A literal expression matches only the exact specified character string. Literal expressions are sensitive to case, punctuation, and spacing, and are specified by enclosing the word or phrase within double quotes, in the form: "some string."

B. Canonical Form Expressions

Canonical form expressions match the specified string and any variations in inflection or form, such as capitalization, tense, or other valid morphological variations. Canonical form expressions are specified by either (1) a non-quoted string beginning with an upper- or lower-case letter, succeeded by any alphanumeric characters, with no punctuation or spaces, or (2) any alphanumeric string enclosed within single quotes, including punctuation and spaces. The expression 'cat' matches cat, Cat, cats, Cats, and cat's, but not catalog.

C. Concept Expressions

Concept expressions match occurrences of the specified concept and its synonyms and are specified by the concept name within angle brackets. Concept names consist of three identifiers, separated by periods, such as: <pos.domain.headword>. Here, "pos" specifies the concept's part of speech; "domain" specifies the domain to which the concept is assigned; and "headword" specifies the concept headword, which is an indicator for the collection of specified synonyms and other relationships that define the concept. As an example, the expression <noun.animal.cat> matches Cat, cats, and feline, but not catalog.

II. Operators

IML operators specify the relevant portion, or "range," of a request (e.g., during query processing) or a content source, such as a document, (during semantic indexing) over which to apply an IML expression. To perform an action, the rules engine matches expressions within the specified portion of the document or request. For example, you can specify operators to apply expressions to:

- sentences within documents
- entire documents
- sentences within documents having titles that match a specified expression
- combining operators Range Operators specify the scope, or amount of surrounding text that will be associated with specified expressions. Examples of ranges include phrase, sentence, and proximity within a specified number of words. For example, a literal expression "cat" will match any occurrences of the string cat. A sentence range operator specifies that this expression will apply to, or match, sentences that contain the string "cat". A document range operator specifies that this expression will match documents that contain the string cat.

The phrase and proximity Range Operators apply to both conditions (e.g., question pattern) and actions (search component and direct IML expressions). The sentence, title, subtitle, section, document, and reference Range Operators typically only apply to actions (search component and direct IML).

A. Phase Range Operator

The phrase (PHRASE) range operator returns phrases that contain all of the expressions specified as arguments. For example, PHRASE(<cat>,<hat>) matches phrases containing both of the concepts (or synonyms of) "cat" or "hat."

B. Sentence Range Operator

The sentence (SENT) range operator returns sentences that contain all of the expressions specified as arguments. SENT is valid only within Rule actions.

| Sentence Range Operator | |
|---|---|
| *Syntax:* SENT([expression]{separator expression}) | A programmer specifies the sentence range operator in this form |
| *where:* | |
| expression | specifies a valid IML expression as an argument that the range operator will apply to |
| separator | specifies an argument separator, if required |
| combining operator | specifies a combining operator, if required |
| *Example:* | |
| Specify SENT(<cat>,<hat>) | To match sentences containing both of the concepts (or synonyms of) cat or hat |

C. Title Range Operator

The title (TITLE) range operator returns documents having titles that contain all of the expressions specified as arguments. Document titles are determined during semantic indexing. TITLE is valid only within Rule actions.

| Title Range Operator | |
|---|---|
| *Syntax:* TITLE([expression]{separator | combining operator}{expression}) | A programmer specifies the title range operator in this form |
| *where:* | |
| expression | specifies a valid IML expression as an argument that the range operator will apply to |
| separator | specifies an argument separator, if required |
| combining operator | specifies a combining operator, if required |
| *Example:* | |
| Specify TITLE(<cat>,<hat>) | To match documents with titles that contain both of the concepts (synonyms of) cat or hat |

D. Subtitle Range Operator

The subtitle (SUBTITLE) range operator returns document sections having applied subtitles that contain all of the expressions specified as arguments. Document subtitles are determined during semantic indexing. SUBTITLE is valid only within Rule actions.

| Subtitle Range Operator | |
|---|---|
| *Syntax:*<br>SUBTITLE([expression]{separator \| combining operator}{expression}) | The programmer specifies the subtitle range operator in this form |
| *where:* | |
| expression | specifies a valid IML expression as an argument that the range operator will apply to |
| separator | specifies an argument separator |
| combining operator | specifies a combining operator, if required |
| *Example:* | |
| Specify SUBTITLE(<cat>,<hat>) | *To match* document sections having subtitles that contain both of the concepts (synonyms of) cat or hat |

E. Section Range Operator

The section (SECTION) range operator returns document sections that contain all of the expressions specified as arguments. Document sections are determined during semantic indexing. SECTION is valid only within Rule actions.

| Section Range Operator | |
|---|---|
| SECTION([expression]{separator \| combining operator{expression}) | The programmer specifies the section range operator in this form |
| *where:* | |
| Expression | specifies a valid IML expression as an argument that the range operator will apply to |
| Separator | specifies an argument separator |
| combining operator | specifies a combining operator, if required |
| *Example:* | |
| Specify SECTION(<cat>,<hat>) | *To match* document sections that contain both of the concepts (synonyms of) cat or hat |

F. Document Range Operator

The document (DOC) range operator returns documents that contain all of the expressions specified as arguments. Documents are defined during semantic indexing. A user's question is also considered a document for purposes of this operator.

| Document Range Operator | |
|---|---|
| *Syntax:*<br>DOC([expression]{separator expression}) | The programmer specifies the title range operator in this form |

| *where:* | |
|---|---|
| expression | specifies a valid IML expression as an argument that the range operator will apply to |
| separator | specifies an argument separator, if required |
| combining operator | specifies a combining operator, if required |
| *Example:* | |
| Specify DOC(<cat>,<hat>) | *To match* documents containing both of the concepts (synonyms of) cat or hat |

G. Proximity Range Operator

The proximity (NEAR) range operator returns a specified range of words that contains all of the expressions specified as arguments. The programmer specifies the range as a parameter, n. NEAR is valid within Rule conditions and actions.

| Proximity Range Operator | |
|---|---|
| *Syntax:*<br>NEAR_n([expression]{separator expression}) | The programmer specifies the proximity range operator in this form |
| *where:* n specifies the number of offsets that defines the range. Offsets indicate unique index positions, approximately equal to single words | |
| expression | specifies a valid IML expression as an argument that the range operator will apply to |
| separator | specifies an argument separator, if required |
| combining operator | specifies a combining operator, if required |
| *Example:* | |
| Specify NEAR_5(<cat>,<hat>) | *To match* content that includes both of the concepts (synonyms for) cat or hat within a 5 word range |

H. Reference Range Operator

The reference (REFERENCE) range operator returns documents having hypertext links to them that contain all of the expressions specified as arguments. REFERENCE is valid only within Rule actions.

| Reference Range Operator | |
|---|---|
| *Syntax:*<br>REFERENCE([expression]{separator combining operator}{expression}) | The programmer specifies the reference range operator in this form |
| *where:* | |
| expression | specifies a valid IML expression as an argument that the range operator will apply to |

| separator | specifies an argument separator, if required |
|---|---|
| combining operator | specifies a combining operator, if required |
| *Example:* | |
| Specify REFERENCE(<cat>,<hat>) | *To match* documents having hypertext links pointing to them that contain both of the concepts (synonyms of) cat or hat |

I. Combining Operators

Combining Operators specify operations on expressions or their associated ranges. Combining Operators are used to match an area of content that is defined as the result of an operation on two or more specified ranges. For example, an intersection combining operator can be configured to return only these sentences that include both of two specified concepts. Combining Operators are specified inline, between the expressions on which they operate. The expressions that are combined can be any valid IML expressions. Combining Operators are either binary or have Boolean (and/or) semantics.

J. Intersection Operator

The intersection (IS) combining operator specifies the intersection of the ranges of the specified expressions.

| Intersection Operator | |
|---|---|
| *Syntax:*<br>{expression} IS {expression} | The programmer specifies the intersection combining operator in this form |
| *where:* | |
| expression | specifies a valid IML expression that the operator will apply to |
| *Example:* | |
| Specify SENT(<cat>) IS PHRASE(<hat>) | *To match* sentences that contain the concept <cat>, which are also sentences which contain the concept hat. |

K. Union Operator

The union (OR) combining operator specifies the union of the ranges of the specified expressions.

| Union Operator | |
|---|---|
| *Syntax:*<br>{expression} OR {expression} | The programmer specifies the union combining operator in this form |
| *where:* | |
| expression | specifies a valid IML expression that the |

|  | operator will apply to |
|---|---|
| *Example:* | |
| Specify SENT(<cat>OR<hat>) | *To match* sentences that contain either of the concepts (synonyms of) cat or hat |

L. Difference Operator

The difference (ISNT) combining operator specifies the difference of ranges of the specified expressions.

| Difference Operator | |
|---|---|
| *Syntax:* {expression} ISNT {expression} | The programmer specifies the difference combining operator in this form |
| *where:* | |
| expression | specifies a valid IML expression that the operator will apply to |
| *Example:* | |
| Specify SENT(<cat>) ISNT SENT(<hat>) | *To match* sentences that contain the concept (synonyms of) cat, excluding sentences that also include the concept hat |

M. Offset Difference Operator

The difference offset (WITHOUT) combining operator specifies the range of difference of the specified expressions.

| Offset Difference Operator | |
|---|---|
| *Syntax:* {expression} WITHOUT {expression} | The programmer specifies the difference offset operator in this form |
| *where:* | |
| expression | specifies a valid IML expression that the operator will apply to |
| *Example:* | |
| Specify DOC(<cat>) WITHOUT SENT(<hat>) | *To return* offset ranges from documents that contain the concept (synonyms of) cat, excluding sentence ranges that include the concept hat |

N. Offset Intersection Operator

The overlap (OVERLAP) combining operator specifies the ranges representing the offset overlap of all arguments. The overlap operator returns the portion of the text that the specified expressions have in common.

| Offset Intersection Operator | |
|---|---|
| *Syntax:*<br>{expression}OVERLAP{expression} | The programmer specifies the overlap range operator in the form |
| *where:* | |
| expression | specifies a valid IML expression that the operator will apply to |
| *Example:* | |
| Specify SUBTITLE(cat) OVERLAP hat | *To match* occurrences of hat located within section offset ranges that have cat in their subtitles |

A. III. Keywords

Keywords perform specific matching functions and are used to limit matching for an expression to the specified characteristic. For example, one can specify keywords to represent any single word, or to match an expression only if the matching offset is the first word in a document. One can specify keywords inline within the expression to which they apply. The following keywords are valid in IML:

- WORD, which matches any, but exactly one, token
- BEGIN, which matches the first word in a document
- END, which matches the last word in a document
- THIS, which assigns a concept sense to one or more tokens in IML expressions within the Dictionary

A. WORD Keyword

The WORD keyword matches any, and exactly one word.

| WORD Keyword | |
|---|---|
| *Syntax:*<br>[expression] WORD [expression] | The programmer specifies the WORD keyword in this form |
| *where:* | |
| expression | specifies any valid IML expression |
| *Example:* | |
| Specify this WORD house | *To match* any single word within a matched expression, for example:<br>this old house<br>this red house<br>And not match this big old house, this house<br>Note: You can modify the WORD keyword to match multiple words using number |

| | expressions, as described in Section IV. |
|---|---|

B. BEGIN Keyword

The BEGIN keyword specifies the beginning of a document, prior to the first word. Use the BEGIN keyword to limit matching for an expression to the first word in a document.

| BEGIN Keyword | |
|---|---|
| *Syntax:* BEGIN expression | The BEGIN keyword is specified in this form |
| *where:* BEGIN specifies to match prior to the first word in a document, and expression specifies any valid IML expression | |
| expression | specifies any valid IML expression |
| *Example:* | |
| Specify DOC (BEGIN <cat>) | *To match* documents having the concept (synonyms of) cat as the first word in the body of the document |

C. END Keyword

The END keyword specifies the end of a document, after the last word. Use the END keyword to limit matching for an expression to the last word in a document.

| END Keyword | |
|---|---|
| *Syntax:* END expression | The programmer specifies the END keyword in this form |
| *where:* END specifies to match only the first word in a document | |
| expression | specifies any valid IML expression |
| *Example:* | |
| Specify DOC (<cat> END) | *To match* documents having the concept (synonyms of) cat as the last word in the body of the document |

D. THIS Keyword

The THIS keyword is valid only in IML expressions within concept definitions in the Dictionary. The THIS keyword specifies a part of an IML expression that represents the defined concept, and limits the part of expression that the rules engine will use as the concept in subsequent operations.

| THIS Keyword | |
|---|---|
| *Syntax:* | The programmer specifies the THIS keyword |

| expression=THIS | in this form |
|---|---|
| *where:* THIS specifies the portion of the expression to use as the concept in subsequent operations ||
| expression | specifies any valid IML expression that defines the concept |
| *Example: Defining the concept <online_banking>* ||
| Specify NEAR_5((online OR virtual), banking=THIS) | *To define* a concept <online banking><br>*That matches* portions of text like:<br>"banking online is fun and easy..."<br>"try banking the virtual way with our..."<br>*And specifies that*<br>the rules engine will use the word banking in subsequent operations on this concept |

B.  IV. Number Expressions

Number expressions specify a number or range of occurrences to match the expression to which they apply. Number expressions are applied to numeric ranges for any valid IML expressions. For example, one can specify to match one or more occurrences of an expression, or up to five occurrences (for example) of a specified expression. The following number expressions are valid in IML:

- simple range number expressions.
- ascending range number expressions.
- descending range number expressions.

General Rules for Specifying Number Expressions

A user specifies number expressions as a single range of integers separated by a hyphen and enclosed within parentheses. Number expressions follow the expression to which they apply.

| Numerical Expression ||
|---|---|
| *Syntax:*<br>expression(number_expression) | A user specifies number expressions in this form |
| *where:* ||
| Number_expression | specifies a valid number expression |
| expression | specifies any valid IML expression |

A. Simple Range

The simple range number expression specifies a range that spans the specified lower and upper boundaries.

| Simple Range | |
|---|---|
| *Syntax:* expression(n-m) | A programmer specifies the simple range number expression in this form |
| *where:* n specifies the lower limit of the range  m specifies the upper limit of the range, where the value of "m" must be greater than or equal to the value of "n" | |
| expression | specifies any valid IML expression |
| *Example:* | |
| Specify <hat>(2-3) | *To match* occurrences of the concept (synonyms of) hat in a series of two or three: hat hat hat hat hat *And not match* single occurrences of the term hat  Note: In the match example, the rules engine would produce a total of four matches: <br>• a match for the series of two hats on the first line: {hat hat} <br>• a match for the first series of two hats on the second line: {hat hat} hat <br>• a match for the second series of two hats on the second line: hat {hat hat} <br>• a match for the series of three hats on the first line: (hat hat hat) |

B. Ascending Range

The ascending range number expression specifies all integers greater than or equal to the specified lower boundary.

| Ascending Range | |
|---|---|
| *Syntax:* expression (n-) expression | A programmer specifies the ascending range number expression in this form |
| *where:* n specifies the lower limit of the range expression | |
| expression | specifies any valid IML expression |
| *Example:* | |
| Specify cat WORD(2-) hat | *To match* occurrences of the specified expressions cat and hat having intervening words within the specified range or two or more: cat and the hat cat and the red hat *And not match* occurrences of the specified |

|  | expressions cat and hat having intervening words beyond the specified range of two or more: cat and hat |
|---|---|

C. Descending Range

The descending range number expression specifies all integers less than or equal to the specified upper boundary, including 0.

| Descending Range | |
|---|---|
| *Syntax:* expression(-n) | A programmer specifies the descending range number expression in this form: |
| *where:* n specifies the lower limit of the range | |
| expression | specifies any valid IML expression |
| *Example:* | |
| Specify cat WORD(-2) hat | *To match* occurrences of the specified expressions cat and hat having intervening words within the specified range or two or fewer: cat hat cat and hat cat and the hat *And not match* occurrences of the specified expressions cat and hat having intervening words beyond the specified range of two or fewer: cat and the red hat |

V. Macros

Macros are assigned character substitutions for commonly specified IML expressions. Macros may be defined by the user as an arbitrary valid IML expression. In addition, several macros are included as part of the IML language.

\*: specifies 0 or more occurrences of keyword WORD
+: specifies 1 or more occurrences of keyword WORD A programmer defines new macros inline within IML expressions, in the form:
{expression}macro{expression}

A. Zero or More Words Macro

| Zero or More Words Macro |
|---|
|  |

| Syntax: * | A programmer specifies the macro * to match occurrences of zero or more words, in this form |
|---|---|
| *where:* symbol "*" matches occurrences of one or more words | |

Note: The * macro can be expressed in IML as the following keyword and number expression: WORD(0-)

B. One or More Words Macro

| One or More Words Macro | |
|---|---|
| *Syntax:* + | A programmer specifies the macro "+" to match occurrences of one or more words, in this form |
| *where:* symbol "+" matches occurrences of one or more words | |

Note: The + macro can be expressed in IML as the following keyword and number expression: WORD(1-)

C.  VI. Variables

A variable is a symbol that represents a contiguous set of words in a user request. Variables are a method of associating a part of the user request with an expanded (more general) or reduced (more specific) set of meanings. There are local and global variables. Local variables apply only within the rule in which they are specified. Global variables apply within the rule in which they are set, and also within subsequent rules.

The rules engine processes variables during request processing. When a rules engine evaluates a rule as true, it sets any variables specified within that rule. Once a variable is set, its value is substituted when it is referenced from another expression. Local variables can be referenced only by expressions within the same rule (but not from within the expression in which they are set). Global variables can be referenced by any subsequent rules.

Note: a global variable cannot be referenced in a rule that precedes the one in which its value is set. The rules engine checks global variables for validity, and will issue a warning if this occurs. Variables are specified by:

- specifying them within IML expressions
- assigning their values
- referring to them

A. Specifying Variables

| Specifying Variables | |
|---|---|
| *Syntax:*<br>(expression)=variable<br>or<br>(expression)=#variable | A programmer specifies a variable within an IML expression in this format |
| *where:* symbol " # " specifies a global variable, which applies to all subsequent rules. Omitting the # prefix specifies a local variable, which applies only to the current rule | |
| variable can be any alphanumeric string | The first character in the string must be a letter (alpha) character. Letter characters can be upper and lower case. If only upper case characters are specified, the programmer can also use the - (hyphen) character.<br>Global variables can also include the characters:<br>• _ (underscore)<br>• - (hyphen)<br>• $<br>• % |
| *Example:* expression=A | |
| Specify | You can specify the same string for multiple variables. If the programmer specifies the same string for multiple global variables, the Rules Engine adds each assignment as it is processed. |

B. Retrieving Values from Variables

A programmer retrieves the value from a variable using a Variable Instantiation Language (VIL) function. When retrieving the value of a variable, the programmer is to use various VIL functions to determine its value, which *instantiate* it in the context of an individual user request. The programmer specifies these functions using VIL expressions, usually within a rule action. VIL expressions contain one or more function calls, and each function call has one or more optional parameters. (A full specification of VIL is not included here.)

C. Referring to Variables

A programmer can include VIL expressions to refer to variables from within index queries, custom content, SQL queries, or any other expressions or type of expression. The programmer specifies references to variables within curly brackets {}, in the form:

{VIL_expression}
where: {} delimits VIL expressions contained within text, such as IML expressions or custom content. For example, a programmer can use VIL expressions to refer to variables from within custom content specified in the answer section of a rule:

You can buy a {VIL_expression_1} today for {VIL_expression_2}.
*where*:
VIL_expression_1 refers to a variable set in a rule condition that resolves to a product name or type of product mentioned in a user request that matched a price of product rule. VIL_expression_2 refers to a variable instantiated from a database query for the price of the product mentioned in the user request. The instantiated statement displayed by the User Interface might be: You can buy a *Model 500 washer/dryer* today for *$900*.

A programmer can also specify a variable to resolve to a valid IML expression, which the rules engine then evaluates as an action.

What is claimed is:

1. A method comprising:
   configuring, by a computer system, a data structure according to an ontology, wherein the data structure configured according to the ontology comprise a plurality of concepts that are organized in hierarchical layers and that are linked by a set of relationships;
   generating, by the computer system, an index representing stored content based on the data structure configured according to the ontology;
   receiving, by the computer system, a query comprising a natural language expression or a natural language question;
   parsing, by the computer system, the query into elements;
   annotating, by the computer system, the elements so that each element has an associated annotation, wherein the associated annotation defines the respective element as one or both of conceptual and canonical based on the ontology;
   comparing, by the computer system, a first condition of one or more rules from a rules dictionary against the elements and the associated annotations;
   comparing, by the computer system, a second condition of the one or more rules from the rules dictionary against peripheral information attributed to a querier, wherein the peripheral information is distinct from the query and is retrieved from a peripheral information repository;
   generating, by the computer system, an action list corresponding to one or more actions of the one or more rules based on whether the first condition and the second condition are satisfied, the action list comprising first search operator criteria that specifies a first scoring scope of search and second search operator criteria that specifies a second scoring scope of search, wherein the first scoring scope of search is different from the second scoring scope of search in order of priority and scoring;
   selecting, by the computer system and based on one or both of the first search operator criteria and the second search operator criteria in the action list, one or more retrieval technologies from a plurality of retrieval technologies, the plurality of retrieval technologies comprising a keyword searching technology, a document-level relevance-based searching technology, and an ontology-based searching technology;
   performing, by the computer system, the one or more actions, the one or more actions comprising using the selected one or more retrieval technologies to retrieve stored content represented in the index based on the elements and the associated annotations; and
   generating, by the computer system, a response to the query using the stored content retrieved based on the index.

2. The method of claim 1, wherein the ontology comprises a hierarchical representation of the concepts and the set of relationships wherein each concept is defined as an expression and is identified as being in either a conceptual form or a canonical form.

3. The method of claim 2, wherein the generating the index comprises:
   parsing the stored content into one or more tokens;
   annotating each token with one or more associated annotations; and
   storing the one or more tokens and associated annotations in the index.

4. The method of claim 3, wherein the annotating each token with the one or more associated annotations comprises defining each token as being conceptual, canonical, or both conceptual and canonical based on the ontology.

5. The method of claim 4, wherein:
   the parsing comprises parsing the received query into one or more tokens;
   the annotating comprises annotating each token of the parsed query with one or more associated annotations defining the token as being conceptual, canonical, or both conceptual and canonical based on the ontology; and
   the comparing the first condition is based on the annotated tokens.

6. The method of claim 5, wherein the second condition defines a context of an application in which the one or more actions are performed, the context of the application comprising: session information corresponding to a session in which the query was initiated; and a web page and content with which the query coincides.

7. The method of claim 5, wherein the generating the response comprises:
   identifying a set of results from the stored content satisfying the query based on performing the one or more actions;
   ordering the identified set of results; and
   presenting the ordered, identified set of results.

8. A system comprising:
   a processor; and
   a memory coupled with and readable by the processor and storing instructions which, when executed by the processor, causes the processor to:
      configure a data structure according to an ontology, wherein the data structure configured according to the ontology comprise a plurality of concepts that are organized in hierarchical layers and that are linked by a set of relationships;
      generate an index representing stored content based on the data structure configured according to the ontology;
      receive a query comprising a natural language expression or a natural language question;
      parse the query into elements;
      annotate the elements so that each element has an associated annotation, wherein the associated annotation defines the respective element as one or both of conceptual and canonical based on the ontology;
      compare a first condition of one or more rules from a rules dictionary against the elements and the associated annotations;
      compare a second condition of the one or more rules from the rules dictionary against peripheral information attributed to a querier, wherein the peripheral information is distinct from the query and is retrieved from a peripheral information repository;
      generate an action list corresponding to one or more actions of the one or more rules based on whether the first condition and the second condition are satisfied, the action list comprising first search operator criteria that specifies a first scoring scope of search and second search operator criteria that specifies a second scoring scope of search, wherein the first scoring scope of search is different from the second scoring scope of search in order of priority and scoring;
      select, based on one or both of the first search operator criteria and the second search operator criteria in the action list, one or more retrieval technologies from a plurality of retrieval technologies, the plurality of retrieval technologies comprising a keyword searching technology, a document-level relevance-based searching technology, and an ontology-based searching technology;

perform the one or more actions, the one or more actions comprising using the selected one or more retrieval technologies to retrieve stored content represented in the index based on the elements and the associated annotations; and generate a response to the query using the stored content retrieved based on the index.

9. The system of claim 8, wherein the ontology comprises a hierarchical representation of the concepts and the set of relationships wherein each concept is defined as an expression and is identified as being in either a conceptual form for or a canonical form.

10. The system of claim 9, wherein the generating the index comprises:

parsing the stored content into one or more tokens;
annotating each token with one or more associated annotations; and
storing the one or more tokens and associated annotations in the index.

11. The system of claim 10, wherein the annotating each token with the one or more associated annotations comprises defining each token as being conceptual, canonical, or both conceptual and canonical based on the ontology.

12. The system of claim 11, wherein the parsing comprises parsing the received query into one or more tokens;
the annotating comprises annotating each token of the parsed query with one or more associated annotations defining the token as being conceptual, canonical, or both conceptual and canonical based on the ontology; and
the comparing the first condition is based on the annotated tokens.

13. The system of claim 12, wherein the second condition defines a context of an application in which the one or more actions are performed, the context comprising: session information corresponding to a session in which the query was initiated; and a web page and content with which the query coincides.

14. The system of claim 12, wherein the generating the response comprises:

identifying a set of results from the stored content satisfying the query based on performing the one or more actions;
ordering the identified set of results; and
presenting the ordered, identified set of results.

15. The system of claim 8, further comprising:

a plurality of processors that comprises the processor;
a plurality of memories that comprises the memory;
the plurality of processors and the plurality of memories facilitate an information retrieval system that comprises:
a language analysis module communicatively coupled to content storage, a multi-layered concept repository, a rules engine, and a semantic indexing engine;
a response engine communicatively coupled to the rules engine, the semantic indexing engine, and the multi-layered concept repository;
the plurality of memories store a set of instructions that comprises the instructions further causing the plurality of processors to:

interface with a remote computing device via a plurality of networks, the remote computing device programmed to automatically form and submit queries to the plurality of processors via the plurality of networks;

provide an administrator interface that allows configuration of operations of the system based on generating instructions to preprocess content from which information will be indexed and used to process questions and to retrieve answers;

cause the system to operate in two modes, the two modes comprising an indexing mode and a query mode, where:

in the indexing mode, the system extracts text from a plurality of textual content sources and indexes the text for retrieval; and in the query mode, the system analyzes one or more questions, received from the remote computing device, against a set of one or more rules, and then forms a response using the text indexed for retrieval;

encode the data structure according to a hierarchical representation of the plurality of concepts and the set of relationships so that the data structure corresponds to the multi-layered concept repository, the encoding comprising defining each concept of the plurality of concepts as an expression and identifying each concept of the plurality of concepts as being in either a conceptual form or a canonical form, wherein:

the ontology comprises the hierarchical representation; and the configuring comprises the encoding and results in an ontology-based concept repository configured to link the plurality of concepts at multiple different concept domain layers, so that:

the concepts of the plurality of concepts are represented by one or more natural language words associated with a first concept domain layer;

at least some of the plurality of concepts are for higher concept domain layers and are represented by one or more natural language words having more specific terms than the one or more natural language words representing the concepts associated with the lower domain layers, the one or more natural language words having more specific terms comprising:

one or more industry-specific terms associated with a second concept domain layer higher than the first concept domain layer; and one or more organization-specific terms associated with a third concept domain layer higher than the second concept domain layer;

at least some of the plurality of concepts are further associated with a part of speech and are defined as a rigid phrase that is matched by any punctuation and inflectional variant of the rigid phrase, or are further defined as a compositional phrase that includes a set of multiple terms that are matched by other concepts that contain all of the multiple terms contained in the set of multiple terms;

a first concept of the plurality of concepts includes:

a first part of speech identifier that identifies a first type of word class;

a first domain identifier identifying one of multiple different concept levels assigned to the first concept; and a first headword that identifies a first collection of synonyms and other relationships that define the first concept;

a second concept of the plurality of concepts includes:

a second part of speech identifier that identifies a second type of word class;

a second domain identifier identifying one of multiple different concept levels assigned to the second concept; and a second headword that identifies a second collection of synonyms and other relationships that define the second concept;

import structured content and unstructured content from the plurality of textual content sources into the content storage, the importing comprising crawling a plurality of remote content sources for web page content and acquiring the web page at least in part by recursively following discovered links within the plurality of remote content sources, wherein the plurality of textual content sources comprises the plurality of remote content sources;

storing managed answers;

operate in the indexing mode and perform the generating the index at least in part by:

transforming, with the language analysis module using an elementizer of the language analysis module to implement a change-based tokenization process, the text from the structured content and the unstructured content stored in the content storage into tokens annotated with additional information to enhance retrieval, the transforming comprising:

parsing the structured content and the unstructured content into a first set of elements used to form a first set of tokens based on the change-based tokenization process that recognizes degrees of character-to-character change in the text;

processing, with an annotator of the language analysis module, each token of the first set of tokens;

annotating, with the annotator, each token of the first set of tokens with one or more associated annotations, wherein the annotating each token with the one or more associated annotations comprises defining each token as being conceptual, canonical, or both conceptual and canonical based on the ontology so that:

when the one or more associated annotations define the respective token as conceptual, the one or more associated annotations comprise a respective concept specification corresponding to the respective token; and when the one or more associated annotations define the respective token as canonical, the one or more associated annotations comprise a respective canonical form corresponding to the respective token; and configuring, with the semantic indexing engine, the index as a semantic index to retrieve from the structured content and the unstructured content and the managed answers stored based on storing the first set of tokens and the one or more associated token annotations in the index;

operate in the query mode and use the language analysis module to parse the query into the elements and to annotate the elements so that each element has the associated annotation so that:

the parsing the query into the elements comprises forming a second set of tokens based on the elements;

the annotating each token of the second set of tokens with the one or more associated annotations defining each token as one or both of conceptual and canonical based on the ontology;

the annotating the elements is based on matching ones of the elements against concepts stored in the multi-layered concept repository to produce conceptual annotations;

perform the comparing the first condition at least in part by:

matching, via a regular expression language specifying the first condition of the one or more rules, the second set of tokens and the one or more associated annotations with a particular concept in the multi-layered concept repository at least in part by determining if at least part of the second set of tokens and the one or more associated annotations shares a common ancestor in the multi-layered concept repository with a question example from the rules dictionary;

using the particular concept matched as a key to search the semantic index;

determining range operators that specify a query scope or amount of surrounding text in the query that is compared with specified expressions of the one or more rules; and comparing the query with the first part of speech identifier, the first domain identifier, the first headword, the second part of speech identifier, the second domain identifier, and the second headword; and defining, with the second condition, a context of an application in which the one or more actions are performed, the context of the application comprising: session information corresponding to a session in which the query was initiated; and a web page and content with which the query coincides; and specifying the peripheral information to include data from a particular user profile that is preset prior to generation of the query, the particular user profile specifying prior queries submitted by a respective user of the particular user profile;

specifying the peripheral information to further include a time that the query was initiated and session information or web page information;

selectively firing at least one action of at least one of the one or more rules from the rules dictionary based on results of the comparisons, wherein the selected one or more retrieval technologies comprises at least a first retrieval technology and a second retrieval technology, the selectively firing the at least one action comprises selectively firing a plurality of actions based on:

determining a respective relevancy of each firing action of the plurality of firing actions based on:
the elements and the annotations that contributed to respective results of the comparisons; and determining relevance to the elements and the annotations of individual documents according to weightings specified via the at least one action;

selectively performing each firing action of the plurality of firing actions based upon the respective relevancy;

in response to firing a first action of the one or more actions, operating the first retrieval technology;

in response to a second action of the one or more actions, operating the second retrieval technology that is configured to supply a particular managed answer to the query from the managed answers stored, wherein the managed answer is specified via the one of the rules having the second action;

the first retrieval technology and the second retrieval technology being selected from a group comprising a keyword searching technology, a document-level relevance-based searching technology, and an ontology-based searching technology;

the rules engine is configured to perform the comparing the second condition prior to performing the comparing the first condition;

the generating the response is performed at least partially by a response generator communicatively coupled to the rules engine, and the generating comprises:

identifying a set of results from the stored content satisfying the query based on the semantic index based on performing the one or more actions using the selected one or more retrieval technologies;

determining respective importance of units of information corresponding to the set of results based on a quantifiable measure distinguishable from other actions of other rules, where the quantifiable measure is determined by one or more of an accumulator relevancy determinator, a recency module, a scope-based scorer, and a relative weight determinator, the accumulator relevancy determinator effectuating a degree of document-level relevance based on occurrences of a combination of tokens, stems, and concepts, the recency module providing a relevancy contribution for a particular document with respect to recency of particular information contained in the particular document, the scope-based scorer evaluating one or more of the one or more actions as potential answers to the query at least in part by assigning a respective score to respective actions that is representative of an ability of a scope of a corresponding potential answer to answer the query, the relative weight determinator effectuating a degree of various searching techniques when the query is of general nature and generating results based on weightings of results the accumulator relevancy determinator, the recency module, and the scope-based scorer;

ordering the set of results identified to create an ordered set of results based on the determining each respective importance of the units of the information;

generating a plurality of portions of a display based on the ordered set of results, each portion of the plurality of portions presenting one or more respective units of information based on the respective importance of the one or more respective units of the information, the respective importance of at least one of the corresponding units being based on the relevancy of an identified concept to a document, and the generating the plurality of portions comprising scoring various scopes of the units of the information;

generating, with a response formatter, each portion of the plurality of portions of the display at least in part by adjusting the portion based on a respective scope of the corresponding unit of information, wherein the respective scope is determined by one of a word, a phrase, a sentence, and a document in conjunction with identifiers of at least some of the concepts including the first part of speech identifier, the first domain identifier, the first headword, the second part of speech identifier, the second domain identifier, and the second headword;

presenting at least a first part of a query answer in a portion of a display that adjusts proportionately to a degree of importance of information corresponding to the at least part of the query answer;

selectively displaying at least a second part of the query answer based on a bias requirement, wherein a third action of the one or more actions, when enabled, provides the bias requirement;

displaying the particular managed answer to the query based on the second retrieval technology;

employing anaphora resolution and co-reference resolution for noun phrases at in part by generating a salience list from a previous question, the generating comprising:

retrieving synsets from the previous question, where each synset is a respective set of terms that denotes a similar concept;

discarding entities not compliant with syntactic constraints;

discarding entities not relevant to a content domain or topic by requiring an ontology score to meet a threshold;

partially ordering the salience list using search component scores;

further ordering the salience list using ontology entity scores; and further ordering the salience list using at least some of the synsets in the salience list located furthest left first while moving right and using at least some of the synsets in the salience list having longer ranges first followed by smaller ranges;

generating a follow-up question to the previous question at least in part by:

recognizing certain expressions identifying a follow-up query intent;

annotate a first question portion that will be used to replace a first portion of the previous question;

annotate a second question portion that will be used to supplement the previous question;

determine a portion of the previous question to be subtracted;

identifying, using the ontology, a common ancestor and a cousin concept of at least one concept in the previous question;

replacing or supplementing the at least one concept in the previous question with the cousin concept; and subtracting the portion of the previous question to be subtracted.

16. A computer-readable memory, which is non-transitory and comprises a set of instructions stored therein which, when executed by a processor, causes the processor to:

configure a data structure according to an ontology, wherein the data structure configured according to the ontology comprise a plurality of concepts that are organized in hierarchical layers and that are linked by a set of relationships;

generate an index representing stored content based on the data structure configured according to the ontology;

receive a query comprising a natural language expression or a natural language question;

parse the query into elements;

annotate the elements so that each element has an associated annotation, wherein the associated annotation defines the respective element as one or both of conceptual and canonical based on the ontology;

compare a first condition of one or more rules from a rules dictionary against the elements and the associated annotations;

compare a second condition of the one or more rules from the rules dictionary against peripheral information attributed to a querier, wherein the peripheral information is distinct from the query and is retrieved from a peripheral information repository;

generate an action list corresponding to one or more actions of the one or more rules based on whether the first condition and the second condition are satisfied, the action list comprising first search operator criteria that specifies a first scoring scope of search and second search operator criteria that specifies a second scoring scope of search, wherein the first scoring scope of search is different from the second scoring scope of search in order of priority and scoring;

select, based on one or both of the first search operator criteria and the second search operator criteria in the action list, one or more retrieval technologies from a plurality of retrieval technologies, the plurality of retrieval technologies comprising a keyword searching technology, a document-level relevance-based searching technology, and an ontology-based searching technology;

perform the one or more actions, the one or more actions comprising using the selected one or more retrieval technologies to retrieve stored content represented in the index based on the elements and the associated annotations; and generate a response to the query using the stored content retrieved based on the index.

17. The computer-readable memory of claim 16, wherein the ontology comprises a hierarchical representation of the concepts and the set of relationships wherein each concept is defined as an expression and is identified as being in either a conceptual form for or a canonical form.

18. The computer-readable memory of claim 17, wherein the generating the index comprises:

parsing the stored content into one or more tokens;

annotating each token with one or more associated annotations; and storing the one or more tokens and associated annotations in the index.

19. The computer-readable memory of claim 18, wherein the annotating each token with the one or more associated annotations comprises defining each token as being conceptual, canonical, or both conceptual and canonical based on the ontology.

20. The computer-readable memory of claim 19, wherein:

the parsing comprises parsing the received query into one or more tokens;

the annotating comprises annotating each token of the parsed query with one or more associated annotations defining the token as being conceptual, canonical, or both conceptual and canonical based on the ontology; and the comparing the first condition is based on the annotated tokens.

* * * * *